(12) United States Patent
Lam et al.

(10) Patent No.: US 10,297,031 B2
(45) Date of Patent: May 21, 2019

(54) APPARATUS FOR GENERATING MOVEABLE SCREEN ACROSS A THREE DIMENSIONAL SPACE

(71) Applicant: City University of Hong Kong, Kowloon (HK)

(72) Inventors: Miu Ling Lam, Kowloon (HK); Bin Chen, Kowloon (HK); Yaozhun Huang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 370 days.

(21) Appl. No.: 14/961,995

(22) Filed: Dec. 8, 2015

(65) Prior Publication Data

US 2017/0161943 A1    Jun. 8, 2017

(51) Int. Cl.
G06T 7/20     (2017.01)
G02B 27/22    (2018.01)
G03B 21/608   (2014.01)
H04N 13/04    (2006.01)

(52) U.S. Cl.
CPC ............ *G06T 7/20* (2013.01); *G02B 27/2292* (2013.01); *G03B 21/608* (2013.01); *H04N 13/049* (2013.01); *H04N 13/0488* (2013.01)

(58) Field of Classification Search
None
See application file for complete search history.

(56) References Cited

U.S. PATENT DOCUMENTS 6,857,746 B2 *   2/2005   Dyner ................. G03B 21/608
                                                           239/18

* cited by examiner

*Primary Examiner* — Michael J Cobb
(74) *Attorney, Agent, or Firm* — Renner Kenner Greive Bobak Taylor & Weber

(57) ABSTRACT

An apparatus for generating a display medium includes a medium generating module arranged to selectively generate at least one portion of the display medium within a predetermined three-dimensional space, wherein the at least one portion of the display medium is arranged to receive an optical signal representing a visible image so as to display a portion or whole visible image within the predetermined three-dimensional space.

27 Claims, 23 Drawing Sheets

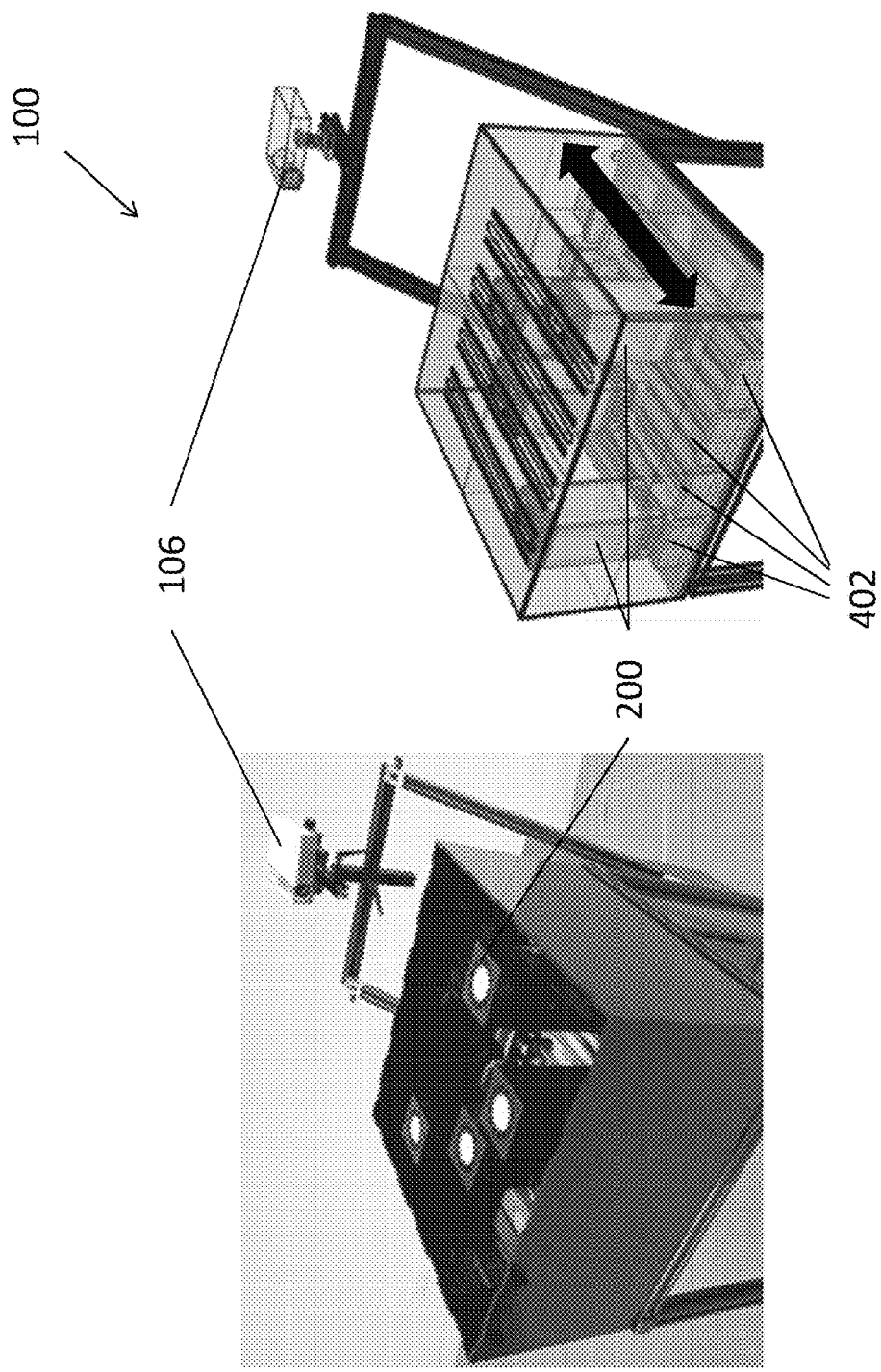

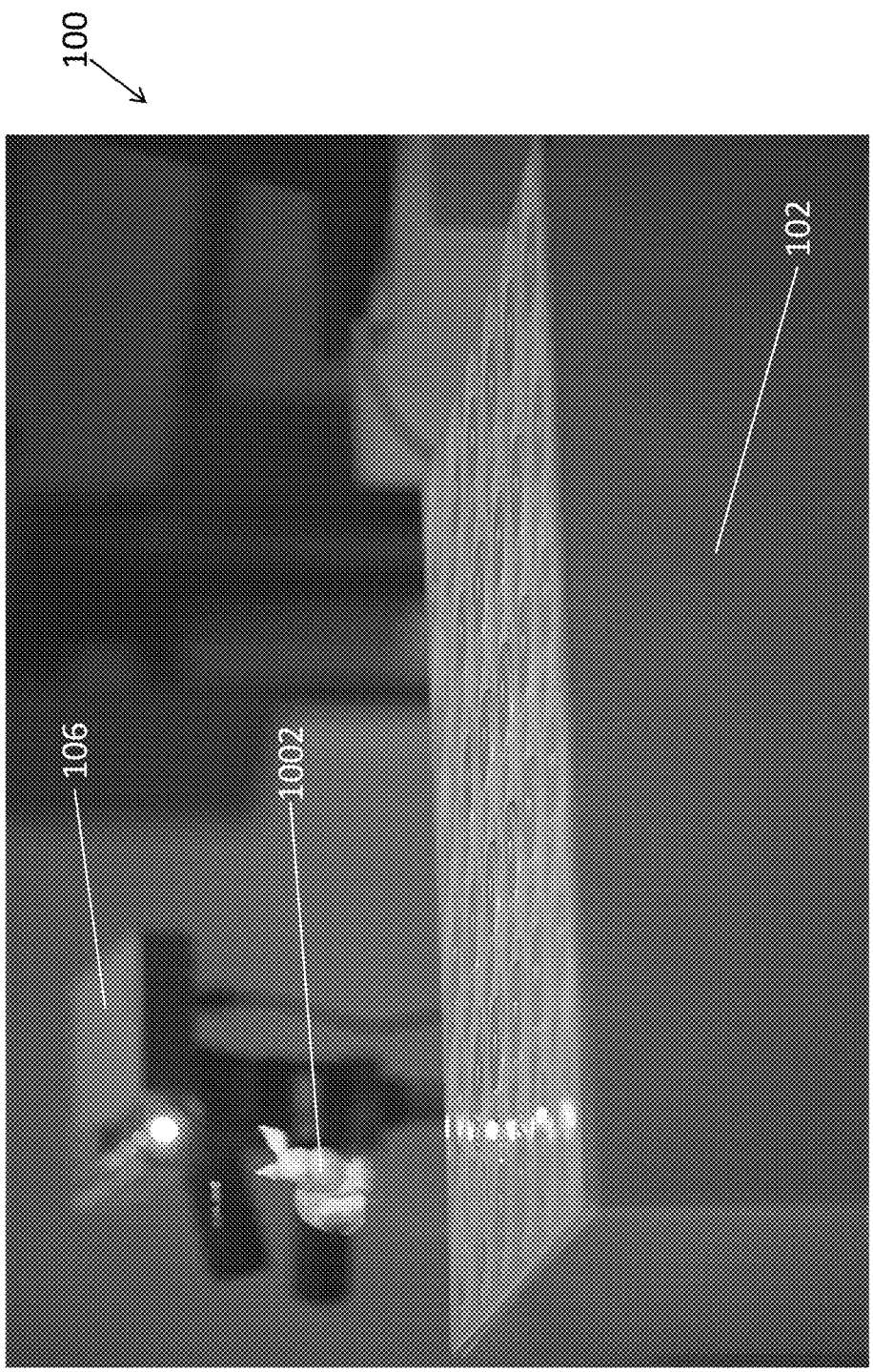

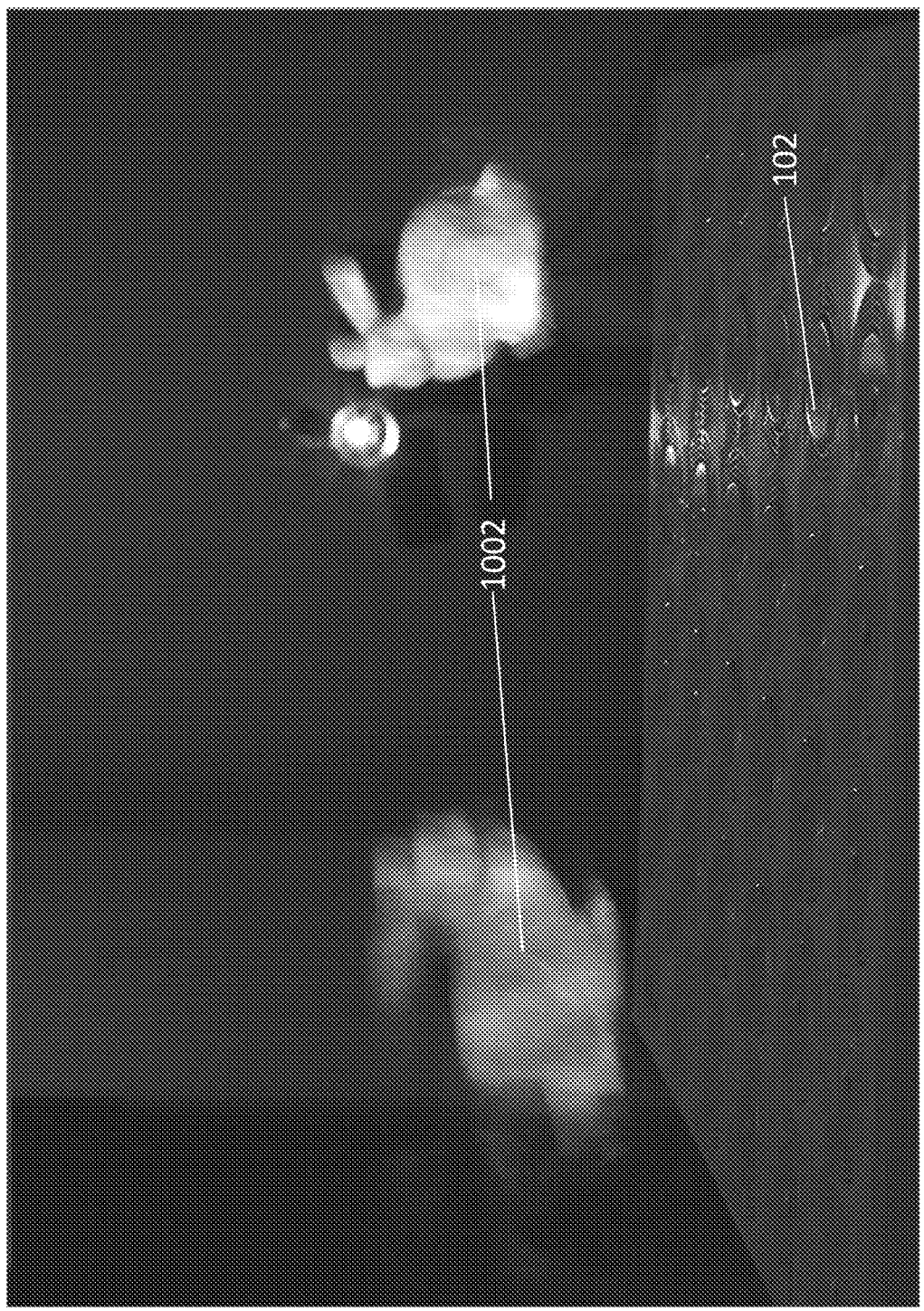

APPARATUS FOR GENERATING MOVEABLE SCREEN ACROSS A THREE DIMENSIONAL SPACE

TECHNICAL FIELD

The present invention relates to an apparatus for generating a display medium, a method of displaying a visible image and a display apparatus, and particularly, although not exclusively, to a three-dimensional display apparatus with a volumetric fog screen and a method of displaying a volumetric image using the three-dimensional display apparatus.

BACKGROUND

Visual displays based on different display technologies may be used for presenting information to one or more observers. Such information may be in form of an image, a moving image, a video, an animation or texts. Example display devices which may be used to present information include computer monitors, image projectors and electronic paper displays.

Due to various limitations of the display medium, the information is usually presenting in two-dimensions. In some advanced displays that use three-dimensional display technologies, observers may perceive a three-dimensional visual impression by separately observing images of a particular scene or of an object in two suitable viewing angles using both eyes. Special glasses or apparatus are required to create such perception of the three-dimensional vision for the observer. There is a known technique of forming a fog screen by blowing a fog from a linear series of nozzles and use it as the screen for receiving an optical image from a projector. However, such prior art fog screens are two-dimensional, flat screens. The images formed by such screens are two-dimensional and have a uniform depth, which do not provide depth information for the observer.

SUMMARY OF THE INVENTION

In accordance with a first aspect of the present invention, there is provided an apparatus for generating a display medium comprising a medium generating module arranged to selectively generate at least one portion of the display medium within a predetermined three-dimensional space, wherein the at least one portion of the display medium is arranged to receive an optical signal representing a visible image so as to display a portion or whole visible image within the predetermined three-dimensional space.

In an embodiment of the first aspect, wherein the medium generating module is arranged to selectively generate the at least one portion of the display medium across a two-dimensional plane within the predetermined three-dimensional space.

In an embodiment of the first aspect, wherein the medium generating module comprises at least one medium generating device arranged to generate the at least one portion of the display medium.

In an embodiment of the first aspect, wherein the at least one medium generating device is arranged to move along the two-dimensional plane so as to selectively generate a plurality portions of the display medium at a plurality of positions across the two-dimensional plane.

In an embodiment of the first aspect, wherein the medium generating module comprises a plurality of medium generating devices arranged in an array positioned along the two-dimensional plane so as to selectively generate a plurality portions of the display medium at a plurality of positions across the two-dimensional plane.

In an embodiment of the first aspect, wherein the portion of the display medium is generated along an axis being substantially orthogonal to the two-dimensional plane.

In an embodiment of the first aspect, wherein the display medium includes a medium substance having a refractive index different from that of a surrounding substance exists in a surrounding environment.

In an embodiment of the first aspect, wherein the medium substance includes water.

In an embodiment of the first aspect, wherein the medium substance is in a form of at least one of mist, fog, vapor, steam and particles.

In an embodiment of the first aspect, wherein the medium generating module further comprises at least one medium aligning device arranged to align the generated portion of the display medium to the axis.

In an embodiment of the first aspect, wherein the at least one medium aligning device includes at least one fan unit arranged to cooperate with each medium generating device.

In an embodiment of the first aspect, wherein the medium generating module comprises at least one ultrasonic piezoelectric transducer arranged to generate the medium substance that suspends in air.

In an embodiment of the first aspect, wherein the display medium is arranged to receive the optical signal generated by an optical projection source, and wherein the visible image is displayed when upon the optical signal is projected on the display medium.

In an embodiment of the first aspect, wherein the visible image is displayed at one or more of a plurality of positions across the two-dimensional plane when upon the optical signal is projected on the portion of the display medium generated at the one or more of the plurality of positions across the two-dimensional plane.

In accordance with a second aspect of the present invention, there is provided a display apparatus comprising: an apparatus for generating a display medium in accordance with the first aspect; and an optical projection source arranged to project an optical signal representing a visible image to the display medium.

In an embodiment of the second aspect, the display apparatus further comprises an image capturing module arranged to capture an image and/or a motion of an object within the predetermined three-dimensional space.

In accordance with a third aspect of the present invention, there is provided a method of displaying a visible image, comprising the steps of: selectively generating at least one portion of the display medium within a predetermined three-dimensional space; and at the at least one portion of the display medium being generated, receiving an optical signal representing a visible image so as to display a portion or whole visible image within the predetermined three-dimensional space.

In an embodiment of the third aspect, wherein the at least one portion of the display medium is selectively generated across a two-dimensional plane within the predetermined three-dimensional space.

In an embodiment of the third aspect, the method further comprises the step of projecting the optical signal on the at least one portion of the display medium so as to display the at least one portion of the visible image.

In an embodiment of the third aspect, wherein the visible image is displayed at one or more of a plurality of positions across the two-dimensional plane when upon the optical signal is projected on the portion of the display medium generated at the one or more of the plurality of positions across the two-dimensional plane.

In an embodiment of the third aspect, the method further comprises the step of aligning the generated portion of the display medium to an axis being substantially orthogonal to the two-dimensional plane.

In an embodiment of the third aspect, the method further comprises the steps of capturing an image of an object placed within the predetermined three-dimensional space and displaying the visible image representing the image at a same or different position of the object placed within the predetermined three-dimensional space.

In an embodiment of the third aspect, the method further comprises the steps of capturing an image of an object placed within the predetermined three-dimensional space and displaying the visible image representing the image that is interactive to the position/shape/color/size of the object placed within the predetermined three-dimensional space.

In an embodiment of the third aspect, the method further comprises the steps of capturing a motion of an object moving within the predetermined three-dimensional space and displaying the visible image representing the motion captured.

BRIEF DESCRIPTION OF THE DRAWINGS

Embodiments of the present invention will now be described, by way of example, with reference to the accompanying drawings in which:

FIG. 4A is a perspective view of a display apparatus having an apparatus for generating a display medium in accordance with an alternative embodiment of the present invention;

FIG. 4B is an illustration showing the movements of the medium generating devices in the medium generating module of the display apparatus of FIG. 4A;

FIG. 10A is an illustration of a visual image displayed on a display medium generated by the apparatus of FIG. 3A within a three-dimensional space;

FIG. 10E is an illustration of multiple visual images displayed on a display medium generated by the apparatus of FIG. 3A within a three-dimensional space;

DETAILED DESCRIPTION OF THE PREFERRED EMBODIMENT

Figure 1:
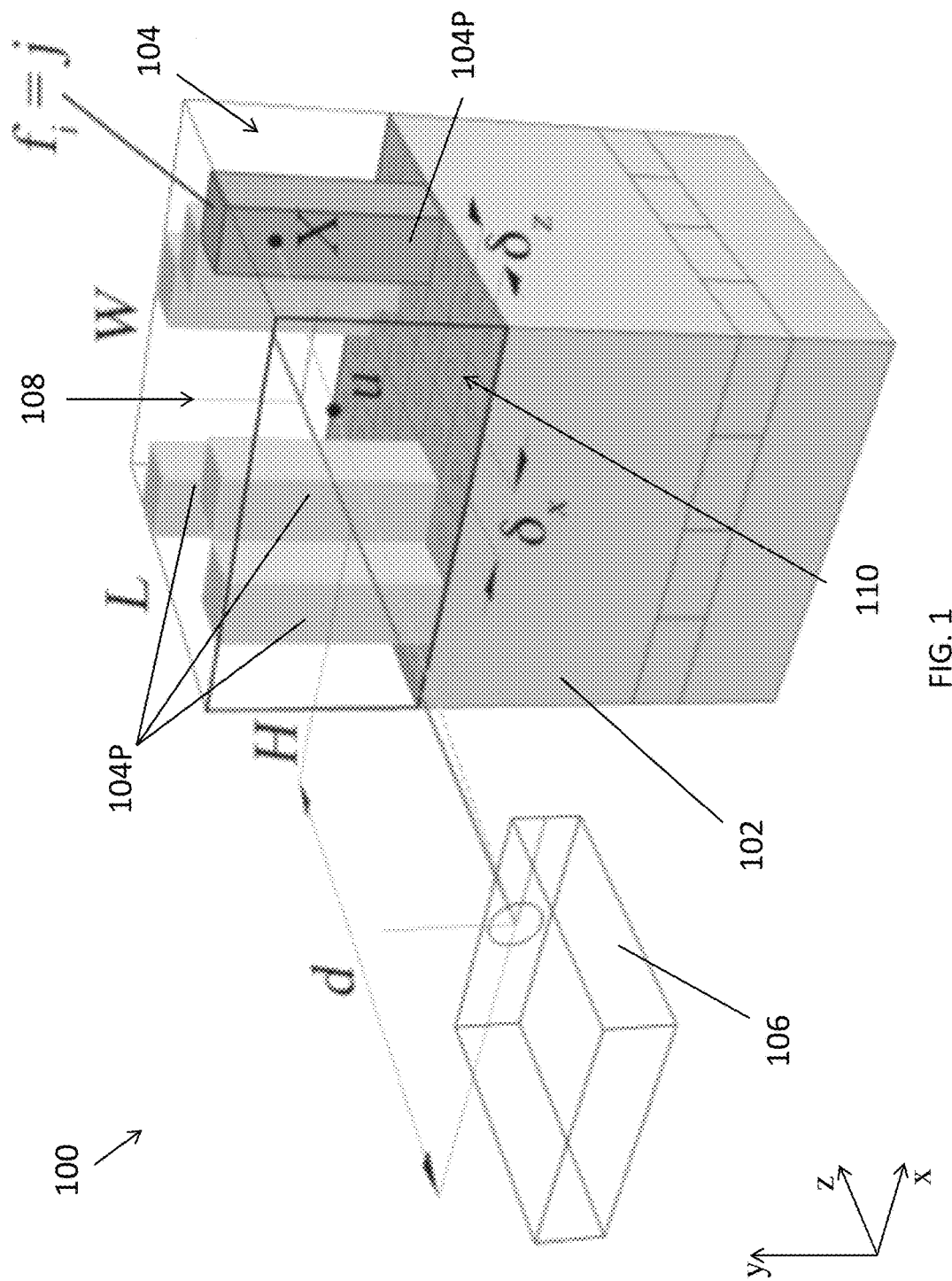
FIG. 1 is a perspective view of a display apparatus in accordance with one embodiment of the present invention.

The inventors have, through their own research, trials and experiments, devised that 3D displays have a wide range of applications in all disciplines, from art, design and entertainment, to engineering and scientific visualization, medical imaging and tele-presence. In one example, autostereoscopic display employs a rapid-spinning mirror to reflect the light field images from a high-speed projector and render a 360° observable image. Other examples includes using swept-volume displays to produce a series of fast-moving slices of the 3D object and base on human's persistence of vision POV to fuse the slices into a single 3D image.

In some of these examples, the display volume may be small and enclosed in a container that is not reachable by users. Some technologies may employ laser-plasma scanning to create an array of illumination points in mid-air. The display produced is sparse (or with low resolution), and single-color high power laser beam would induce safety concerns. In some other technologies such as Pixel Dust, which may use acoustic-potential field to trap and levitate small, light-weight objects by standing waves and create patterns for projection. However, such technology may not be used for high-resolution volumetric display as only a low density, 2D layer of particle pattern can be created at a time.

In some alternative examples, fog or other immaterial medium, such as water, smoke and particles, may be used as projection screens to create unencumbered 3D visuals. For example, a walk-through fog display may create depth cue by head tracking and rendering corrected perspectives. However, such system can only accommodate a single user and wearing infrared LED headset is required for the camera to detect the viewer's location.

Another technique called depth-fused 3D (DFD) which creates 3D perception by superimposing two images on two transparent screens at different depths while varying the luminance. DFD is suitable to be used with mid-air, immaterial displays such as fog screens. A generalized form of DFD may be used which put two fog screens in multiple configurations to create 3D perception. However, this approach is, again, viewpoint-dependent and demands precise tracking of viewer's position. Also, it can only accommodate one viewer at a time.

Motion parallax is another technique that may be used for creating 3D perception. A multi-viewpoint fog display with multiple projectors may be used to project multiple images of the same virtual object from different viewpoints onto one cylindrical fog screen. Walking around the display, observers can perceive the 3D shape of the object based on motion parallax. The angle of projection between each projector for this approach should be kept small enough to avoid "gaps", thus many projectors are needed to facilitate a wide observable angle.

Alternatively, a multi-layered water drop display may be used with a projector-camera system which synchronizes the valves and image. This system requires high-speed camera and compute-intensive control with GPUs to achieve precise drop synchronization. Besides, the drawback of using water drop is that, it is difficult to achieve high-resolution display as each water drop represents only one pixel. Moreover, handling water is less convenient and infrastructures including drains and waterproof measures are required.

With reference to FIG. 1, there is provided an example embodiment of a display apparatus 100 comprising an apparatus for generating a display medium 104 and an optical projection source 106 arranged to project an optical signal representing a visible image to the display medium 104. The apparatus for generating a display medium 104 comprises a medium generating module 102 arranged to selectively generate at least one portion of the display medium 104 within a predetermined three-dimensional space, wherein the at least one portion of the display medium 104 is arranged to receive an optical signal representing a visible image so as to display a portion or whole visible image within the predetermined three-dimensional space.

In this embodiment, the apparatus is arranged to generate a display medium 104 which includes a medium substance such as but not limited to fog or other immaterial medium, such as water (in a form of droplets, mist or vapour), smoke and particles. The medium substance may be arranged to temporally suspend in a volume or a predefined three-dimensional space, forming a "screen" for the projection of light or optical signal thereon.

Preferably, these medium substances may have a refractive index different from that of a surrounding substance exists in a surrounding environment. For example, medium substance such as water mist or fog may be generated and may suspend temporally in air as the surrounding environment. Due to the difference in refractive index of water and air in a certain light spectrum, light striking on the medium substance may encounter refraction, reflection and/or scattering and become "visible" to human eyes or any optical sensors/instruments operable in the corresponding light spectrum. Such optical signal may represent a visible image and thus a portion or whole of the visible image may be displayed on the "screen" or the display medium 104 depending on the size or area of the screen produced by the medium generating module 102.

With reference to FIG. 1, an image projector may be used as the optical projection source 106. As appreciated by a skilled person, the image projector may projects images and/or moving images (video/animation) onto a projection screen, such that the image may be seen or detected. Alternatively, other types of projections sources may be used for projecting images or optical signal on the display medium 104 such that visible image may be displayed on the display medium 104.

Preferably, the display medium 104 may be divided into portions 104P which may be selectively generated within a predetermined three-dimensional space 108, and the visible image may be displayed within the three-dimensional space 108 when the image is projected on the selectively generated portions 104P of display medium 104. For example, the medium generating module 102 is arranged to selectively generate one or more portions 104P of the display medium 104 across a two-dimensional plane 110 (the xz-plane as shown in the Figure) within the predetermined three-dimensional space 108 as shown in FIG. 1, and preferably the portions 104P of the display medium 104 are generated along an axis (the y-axis as shown in the Figure) being substantially orthogonal to the two-dimensional plane 110 such that the display medium 104 is generated in the three-dimensional space 108. These portions 104P of the display medium 104 may then receive optical signals representing a visible image so as to display a (portion of) visible image, and (the portions of) the visible image may only be displayed on the portions with the generated display medium 104 within the predetermined three-dimensional space 108.

Figure 2:
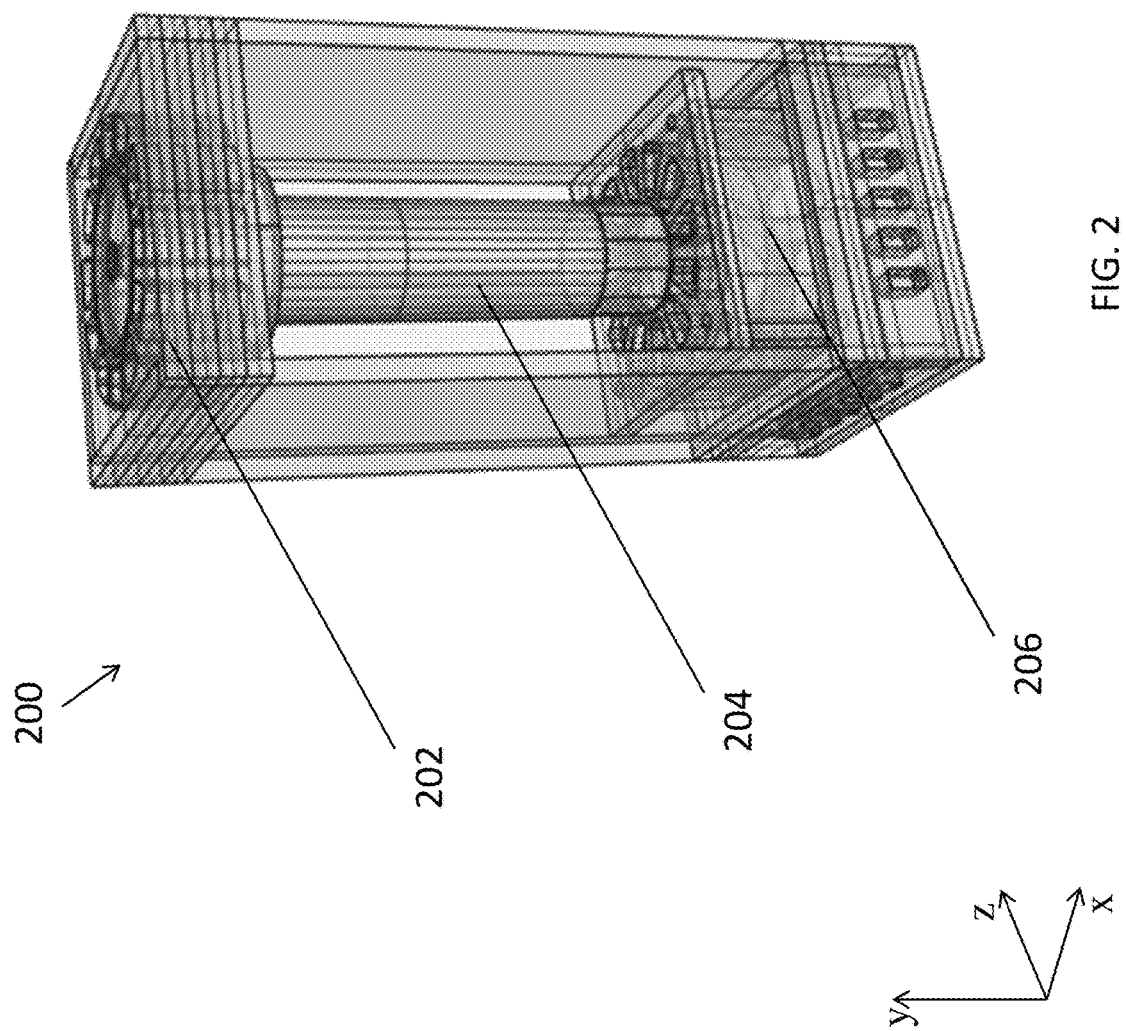
FIG. 2 is a perspective view of a medium generating module of an apparatus for generating a display medium in the display apparatus of FIG. 1.

With reference to FIG. 2, the medium generating module 102 may comprise at least one medium generating device 200 arranged to generate the at least one portion 104P of the display medium 104. In this example, the medium generating device 200 includes an ultrasonic piezoelectric transducer 202 arranged to generate water droplets or mist which may suspend at least temporally in air. Water may be stored and supplied from a tank/bottle 204 below the piezoelectric transducers 202. Optionally, a fan unit 206 may be positioned at the bottom and may be used to generate air flow for guiding the water droplets or mist generated at the top, and suitable air inlets and outlets may also be provided on the medium generating device 200 for the generated air flow to flow through. The air flow generated may improve the quality of the display medium 104 generated, and this will be further described in the later parts of this disclosure.

Figure 3A:
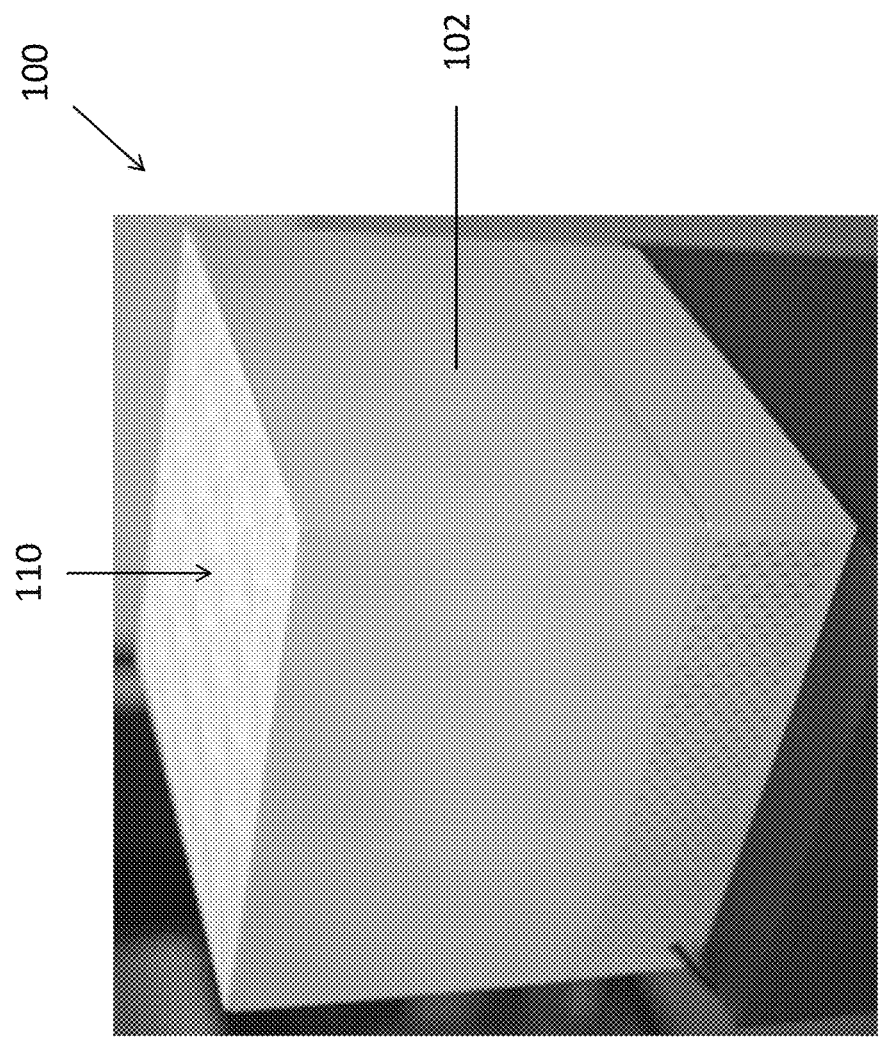
FIG. 3A is a perspective view of an apparatus for generating a display medium in accordance with one embodiment of the present invention.
Figure 3B:
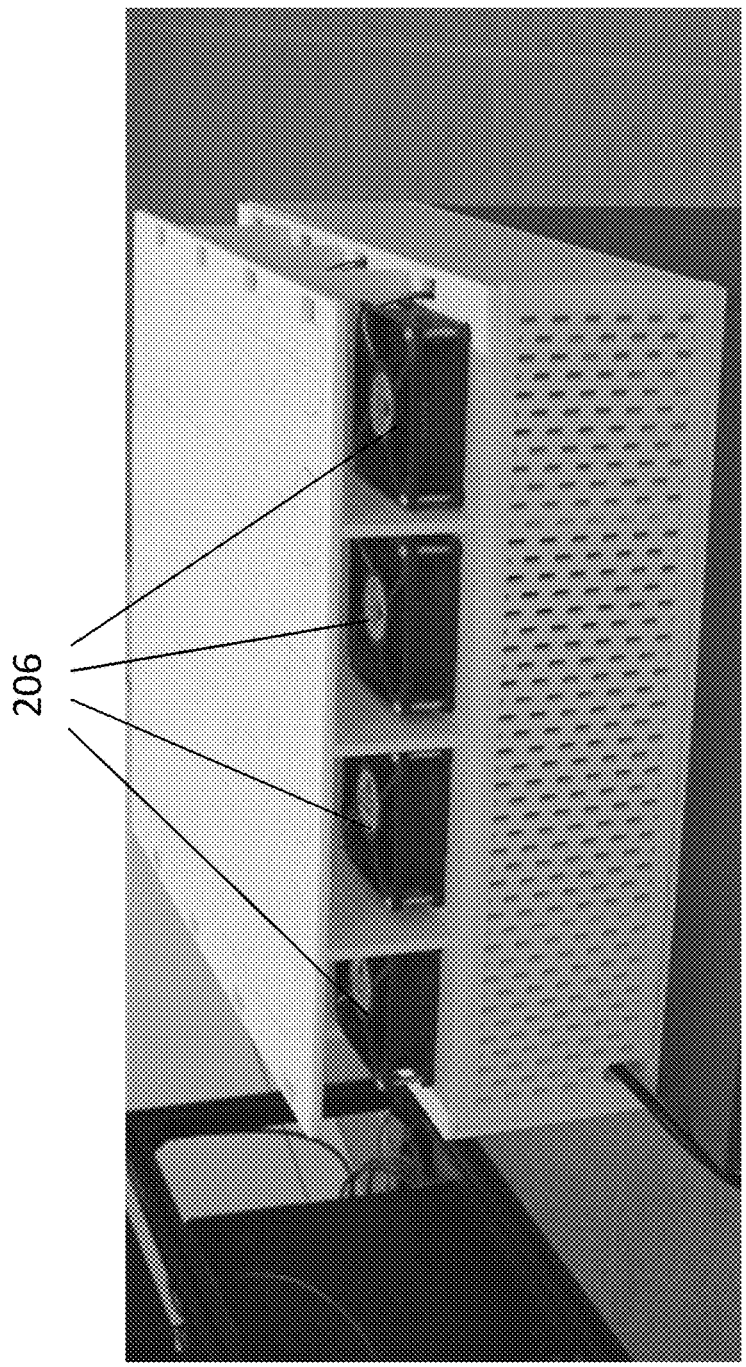
FIG. 3B is a perspective view of a plurality of fan units in the apparatus of FIG. 3A.
Figure 3C:
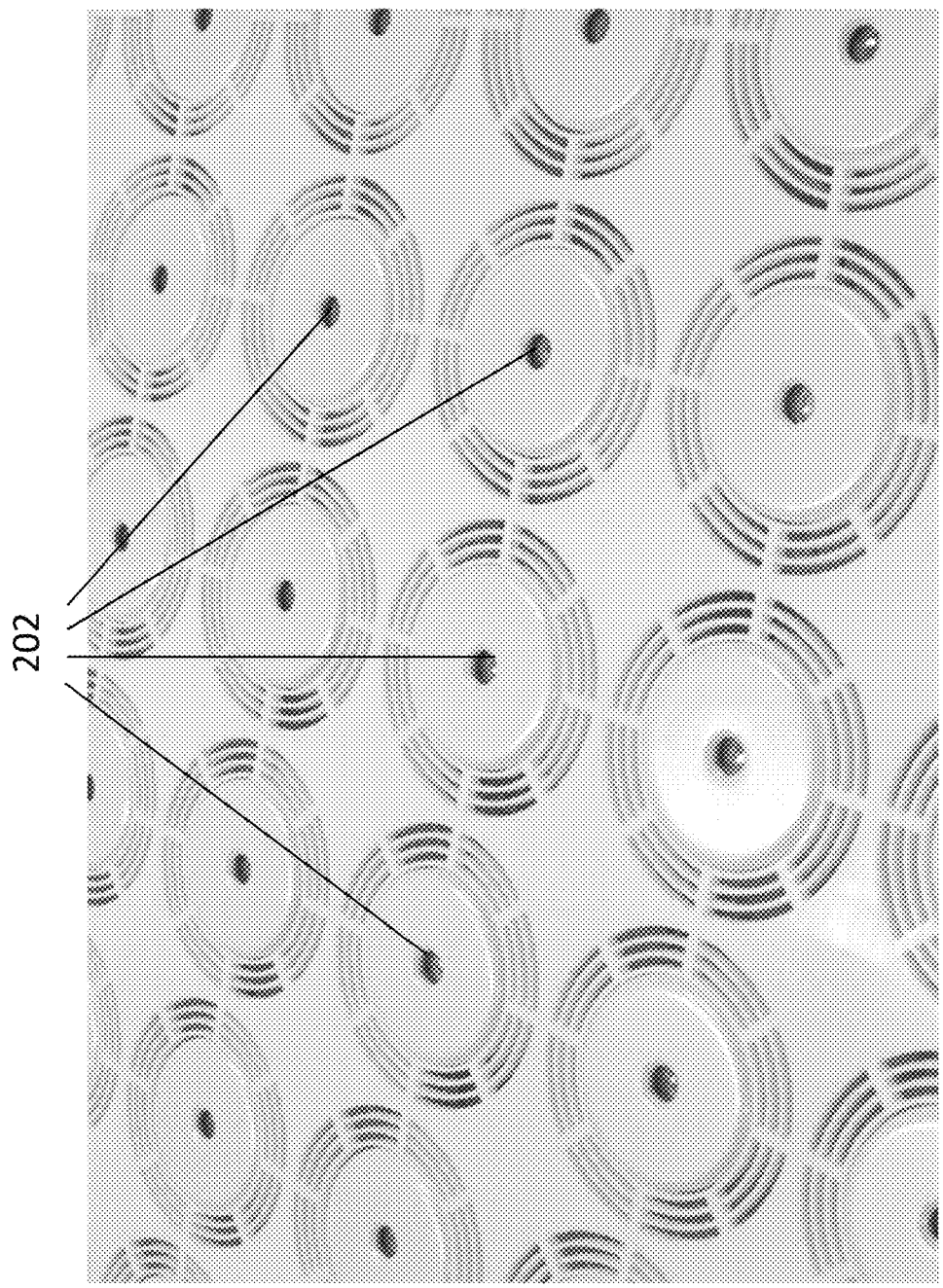
FIG. 3C is a top perspective view of a portion of the apparatus of FIG. 3A.

With reference to FIGS. 3A to 3C, there is shown an example embodiment of an apparatus for generating a display medium 104. The medium generating module 102 comprises a plurality of medium generating devices 200 (such as the one as shown in FIG. 2), and the plurality of medium generating devices 200 arranged in an array positioned along the two-dimensional plane 110 so as to selectively generate a plurality portions 104P of the display medium 104 at a plurality of positions across the two-dimensional plane 110.

Figure 6B:
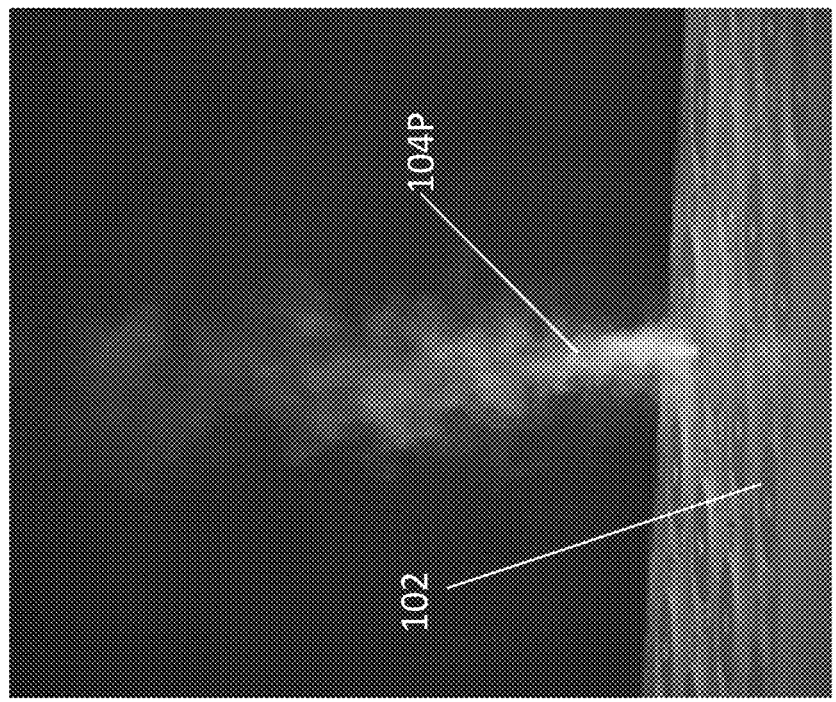
FIG. 6B is an illustration of a portion of the display medium generated by the medium generating module of FIG. 4A, wherein the portion of the display medium is aligned by the air flow generated by a fan unit.
Figure 6A:
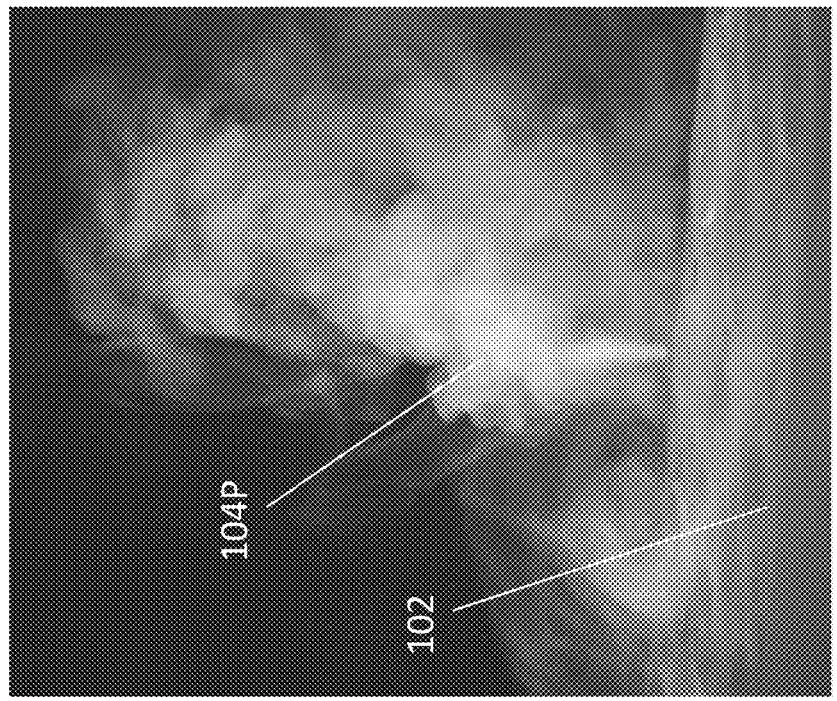
FIG. 6A is an illustration of a portion of the display medium generated by the medium generating module of FIG. 4A.

The fidelity of any fog display system highly relies on the steadiness of fog flow because turbulent flow (as shown in FIG. 6A) will cause severe image distortion from off-axis viewing angles. To ensure laminar flow (as shown in FIG. 6B) while achieving closely-packed arrangement of fog emitter matrix, a triple-deck structure may be used to position the components with reference to FIG. 1 and FIG. 3A. For example, the microcontroller and power supply may be positioned in the bottom layer where there are also ventilation holes for air intake.

An array of electric fans or fan units 206 (as shown in FIG. 3B) may be used as medium aligning device arranged to align the generated portion 104P of the display medium 104 to the axis being orthogonal to the two-dimensional plane 110. The fan units 206 may be placed in the middle layer to bring accelerated airflow continuously from the base to the top layer. Preferably, at least one fan unit 206 is arranged to cooperate with each of the at least one medium generating device 200.

Alternatively, more or fewer fan units may be included to generate the required air flow.

The top layer (as shown in FIG. 3C) contains a matrix of medium generating devices 200, each includes an ultrasonic piezoelectric transducer 202 which generate high frequency oscillation in a film of water and produce microscale droplets that suspend in air. Each of the ultrasonic piezoelectric transducer 202 is attached to a sealed water bottle 204 with a cylindrical sponge to act as capillaries and supply water continuously to the piezoelectric transducer 202. There are arc-shaped vent holes around each nozzle on the roof of the structure to ensure even airflow around each nozzle to limit the droplet spray angle. The packed, parallel pipe structure as used in some fog display systems may also be added the air outlet to further enhance laminar flow. Directed airflow may also help the fog 104 to reach higher. With reference to FIG. 6A, when the fans 206 are turned off, the mist 104 produced is under turbulence without guided airflow. When the fans 206 are on as shown in FIG. 6B, fog stream 104 becomes upright and can reach higher position.

Figure 5:
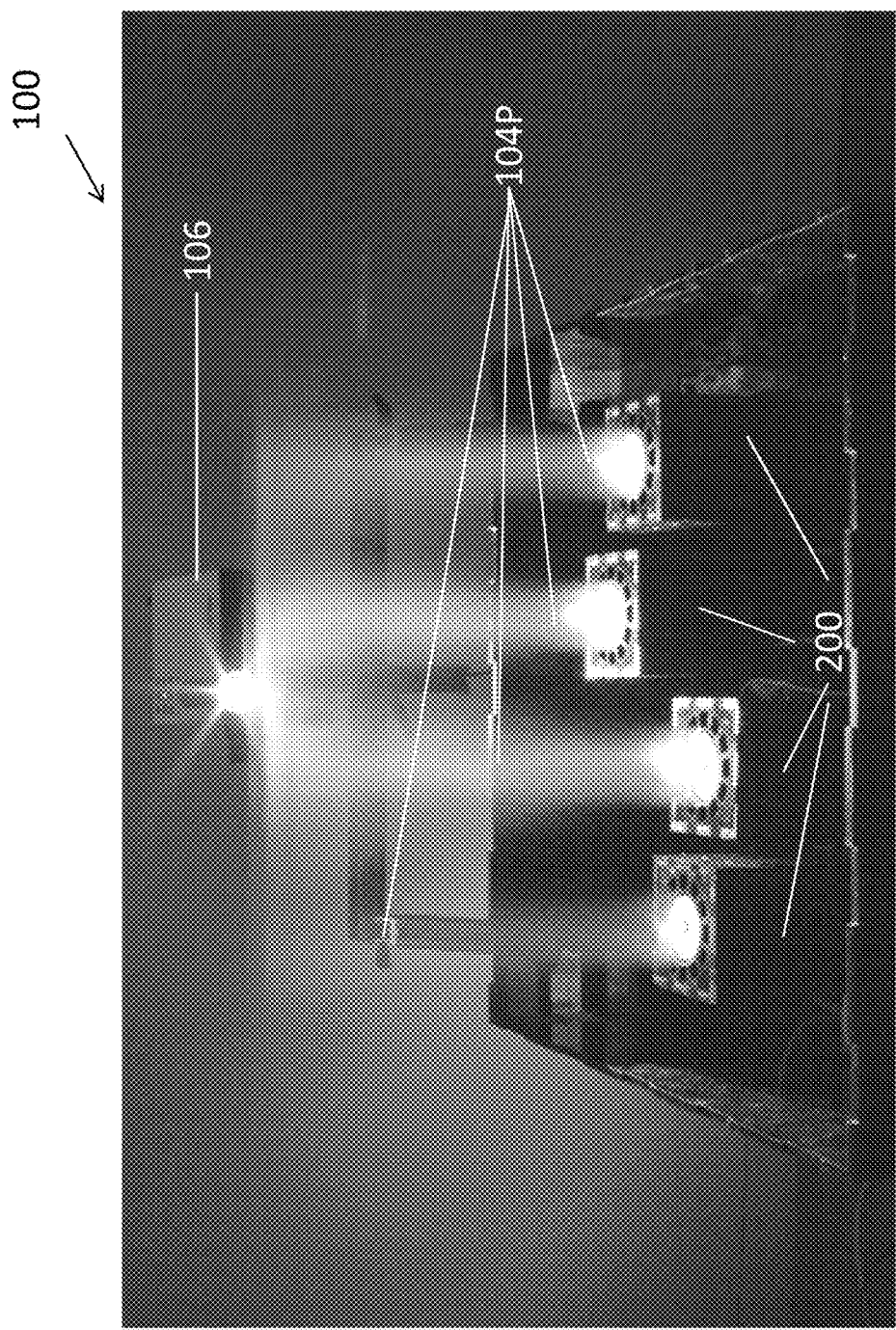
FIG. 5 is a front perspective view of the display apparatus of FIG. 4A, wherein the different portions of the display medium are generated by medium generating devices positioned at different displaying depth.

With reference to FIG. 4A, 4B and 5, there is shown another example embodiment of an apparatus for generating a display medium 104. The medium generating module 102 comprises at least one medium generating devices 200 (such as the one as shown in FIG. 2), and the at least one medium generating devices 200 is arranged to move along the two-dimensional plane 110 so as to selectively generate a plurality portions 104P of the display medium 104 at a plurality of positions across the two-dimensional plane 110.

In this embodiment, the apparatus comprises four medium generating devices 200 arranged in a row, and each of the medium generating devices 200 is arranged to move along an axis on a two-dimensional plane 110 as illustrated in FIG. 4B, such that portions 104P of the display medium 104 may be selectively generated across the two-dimensional plane 110. Alternatively, more or fewer medium generating devices 200 may be included in the medium generating module 102 and the medium generating device 200 may move along both axes on the two-dimensional plane 110.

The movement of the medium generating devices 200 across the two-dimensional plane 110 may be controlled by using one or more linear motion platform 402. For example, high precision linear motion platforms 402 may be used. The platforms 400 are driven by stepper motors which are controlled using motor drivers and microcontroller. The pulse frequency and initial positions of the platforms 402 are precisely calibrated so as to ensure accurate position and speed. The updated positions may be stored in the EEPROM of the microcontroller.

Preferably, each of the medium generating devices 200 is a stand-alone fog emitter having a similar structure as shown in FIG. 2, and the medium generating devices 200 are mounted on a linear motion platform 402 as shown in FIGS. 4A and 4B. Similarly, ultrasonic piezoelectric transducers 202 may be used to generate high frequency oscillation in a film of water and produce microscale droplets that suspend in air. Each piezoelectric transducer 202 is attached to a sealed water container 204 with a cylindrical sponge to act as capillaries and supply water continuously to the transducers 202. There are ventilation holes at the base for air intake. An electric fan 206 is placed below the water container 204 to bring accelerated airflow continuously from the base to the top inside the fog emitter 200. There are arc-shaped vent holes around each nozzle on the roof of the module to ensure even airflow around each nozzle to limit the droplet spray angle. The diameter and height of the fog columns 104P can be adjusted by controlling the piezoelectric transducer's oscillating frequency and fan speed. With reference to FIG. 5, the laminar fog columns 104P formed by the fog emitter 200 modules may be used as the display medium 104 for image projection.

Preferably, the display medium 104 is arranged to receive the optical signal generated by an optical projection source 106 (such as an image projector). The visible image is displayed when upon the optical signal is projected on the display medium 104. As described earlier in the disclosure, one or more portions 104P of the display medium 104 is generated selectively across the two-dimensional plane 110 within a predetermined three-dimensional space 108, therefore the visible image is displayed at one or more of a plurality of positions across the two-dimensional plane 110 when upon the optical signal is projected on the portion of the display medium 104 generated at these positions across the two-dimensional plane 110. When the image is projected on these portions 104P of display medium 104 selectively generated, the visible image may be viewed as a volumetric image.

In this embodiment, the mechanism of the volumetric display and the notations and assumptions used are further explained below. With reference to FIG. 1, this example of the display apparatus 100 includes a calibrated projector and a matrix of fog emitters 200 that produces columns of upward-flowing laminar fog 104P. Each fog emitter 200 is individually switchable and controlled using a microcontroller (such as Arduino). When a fog emitter 200 is switched on, its laminar fog forms an immaterial screen 104 that scatters the light being projected onto it. A clear and bright image can be observed from forward and reverse directions along the projection axis owing to Mie scattering. The switching pattern of fog emitters 200 is tightly synchronized with the image content.

Suppose the fog emitter 200 matrix consists of m columns (in x direction) and n rows (in z direction). The projection image is vertically divided into m segments, while each segment i is associated with a designated depth (image plane j as shown in FIG. 7A) for projection. At any time instant, only one of the n fog emitters 200 per column is activated, thus the corresponding image segment will be formed only at its designated depth. Activating fog emitters 200 in different columns at different depths will create a non-planar fog screen that can be used for displaying volumetric data in real physical space.

Controlling software may be used to automatically transform the image segments in order to correct the distortion arising from the projective geometry on the non-planar screen. When the system is used to display dynamic content such as 3D video, animation and interactive game, the software sends synchronized switching pattern to the microcontroller so that the fog screen elements are reconfigured accordingly.

The origin of the world coordinate system may be fixed at the centroid of the display volume. The projector is precisely aligned such that its coordinate system is in a pure z-translation from the origin of the world coordinate system (projector's principal axis overlaps the world z-axis). The distance between the projector and the fog screen is denoted by d. The width, length and height of the display volume are denoted by W, L and H respectively, where H is obtained by measuring the minimum height of fog that can produce clear image. We assume that the fog nozzles are evenly distributed. The nozzle spacing in x and z directions are denoted by $\delta x$ and $\delta z$. Given the fact that only one fog emitter 200 per column is activated at a time, a fog vector:

$$f=(f_1, f_2, \ldots, f_m)^T, \text{ where } f_i=j\in[1, n] \quad (1)$$

is defined.

When displaying animation, f is input as a time varying vector used for the synchronization between the fog emitter 200 matrix and the dynamic image content. The computer reads the sequence of fog vector and switches on only the fog emitters 200 at column i and row j as specified by (1). Let $X=(x, y, z)^T \in \mathbb{R}^3$ be a point in the world coordinate system, and $u=(u, v)^T \in \mathbb{R}^2$ denotes the pixel coordinates of the image of point X in the projection plane. Since x determines i (segment/column index) thus j (depth/row index) by (1), this turns out to constrain the z-coordinate of X. In other words, given a fog vector f, we can transform the original problem of 3D-to-2D mapping to pure 2D translation and scaling of each of the m image segments.

In order to map the projected image correctly to the non-planar fog screen, the projector's pose and parameters is preferably carefully calibrated. One example method may be used to align and calibrate the projector effectively. One example of such procedures are described below:

Step 1. Align the Projector's Principal Axis with World Z-axis

Figure 7B:
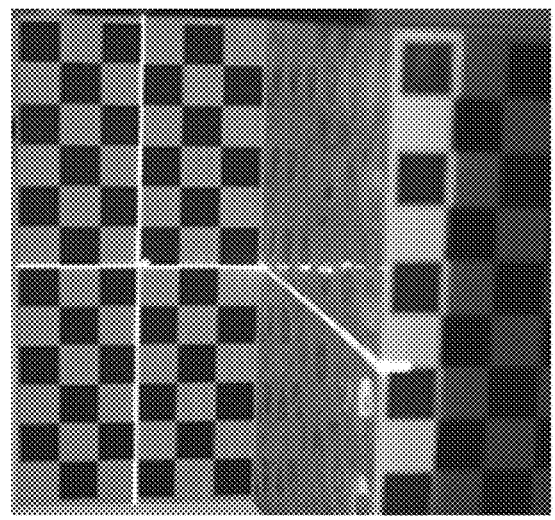
FIG. 7B is an illustration showing cross pattern projected on front and rear planes with checkerboard patterns for projector calibration.
Figure 7A:
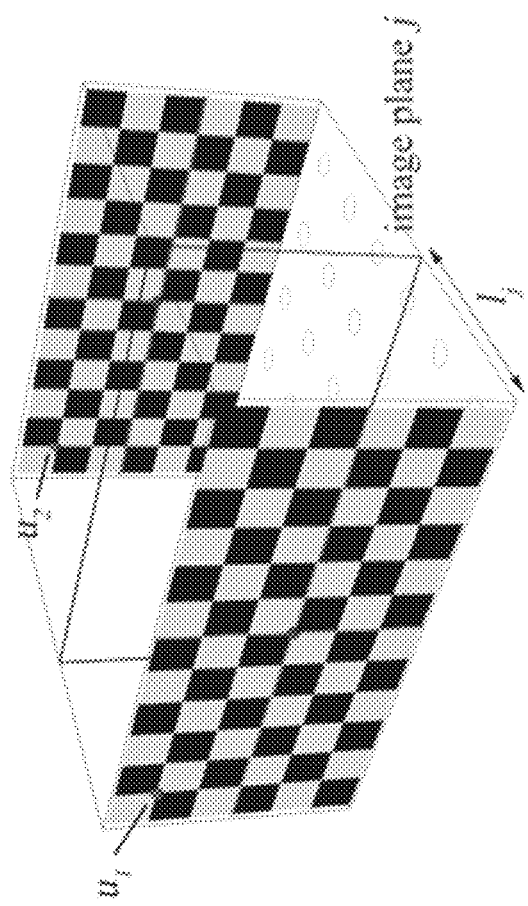
FIG. 7A is an illustration showing cross and checkerboard patterns projected on front and rear planes of a predetermined three-dimensional space of display volume for projector calibration.

With reference to FIGS. 7A and 7B, two checkerboards were attached to the front and rear planes of the displayable volume. A cross pattern as shown in FIG. 7B may be projected on top of both checkerboards. The projector's position and orientation are adjusted such that the cross pattern and its center align precisely with both checkerboards. This procedure can effectively align the projector's principal axis with the world z-axis. It strictly constrains the projector's orientation and x-, y-locations while leaving only 1-DOF for it to translate along the z-direction. The critical projection distance and the formulation of optimal projection distance will be described later. The projector's focal point is set to the origin of the world coordinate (centroid of display volume).

Step 2. Measure Intrinsic Parameters and Distortion Coefficients of the Projector (Optional)

A calibrated camera and code may be used for calibrating the projector. The projector's intrinsic parameters as well as the radial and tangential distortion coefficients were obtained and applied for reprojection.

Step 3. Compute Projection Distance and Field of View

The final calibration step is to measure the actual projection distance d and the horizontal pixel dimension $M_0$ on the front plane. These parameters will allow us to evaluate the display resolution (total number of voxels) and map any point from world coordinate to pixel coordinate. $M_0$ can be easily measured by reading the pixel coordinates on the left and right edges. To accurately measure d without the use of expensive distance sensing equipment. A checkerboard pattern may be projected on the front plane and scale the pattern while fixing the center so that the projected checkerboard overlaps perfectly on the printed checkerboard. The pixel coordinate $u_1$ is saved. By applying the same procedure on the rear plane, the pixel coordinate $u_2$ is saved, where $u_1$ and $u_2$ are related by $u_1=su_2$ and s (>1) is the scaling factor. The projector distance can be computed by:

$$d = \frac{L}{s-1} \quad (2)$$

Notice that, in (2), d is independent of W and H. Let $\theta_x$ and $\theta_y$ be the horizontal and vertical field of view (fov) of the projector:

$$\theta_x = 2\tan^{-1}\left(\frac{MW}{2M_0 d}\right), \quad \theta_y = 2\tan^{-1}\left(\frac{NW}{2M_0 d}\right) \quad (3)$$

where M and N are the native pixel dimensions of the projector. The scale $s_j$ (<1) of each image plane j relative to the front plane can be expressed by:

$$s_j = \frac{d}{d+l_j}, \text{ where } l_j = \frac{1}{2}[L+(2j-n-1)\delta_z] \quad (4)$$

$l_j$ is the distance of image plane j from the front plane.

Thus, given the fog vector $f=\{f_i\}^T$, image segment i should be resized by scale $s_j$ where $f_i=j$. Then, the pixel coordinate of the center of image segment i is translated to the pixel coordinate $u_{ij}$ of the nozzle of the i-th column and j-th row, which can be solved by:

$$u_{ij} = \frac{(2j-m-1)\delta_x s_j M_0}{2W} \quad (5)$$

Alternatively, the scale $s_j$ (<1) of each image plane j relative to the front plane can be expressed by:

$$s_j = \frac{d}{d_j} s \quad (4.1)$$

where $d_j$ is the distance of object j from the projector's focal point.

Figure 8:
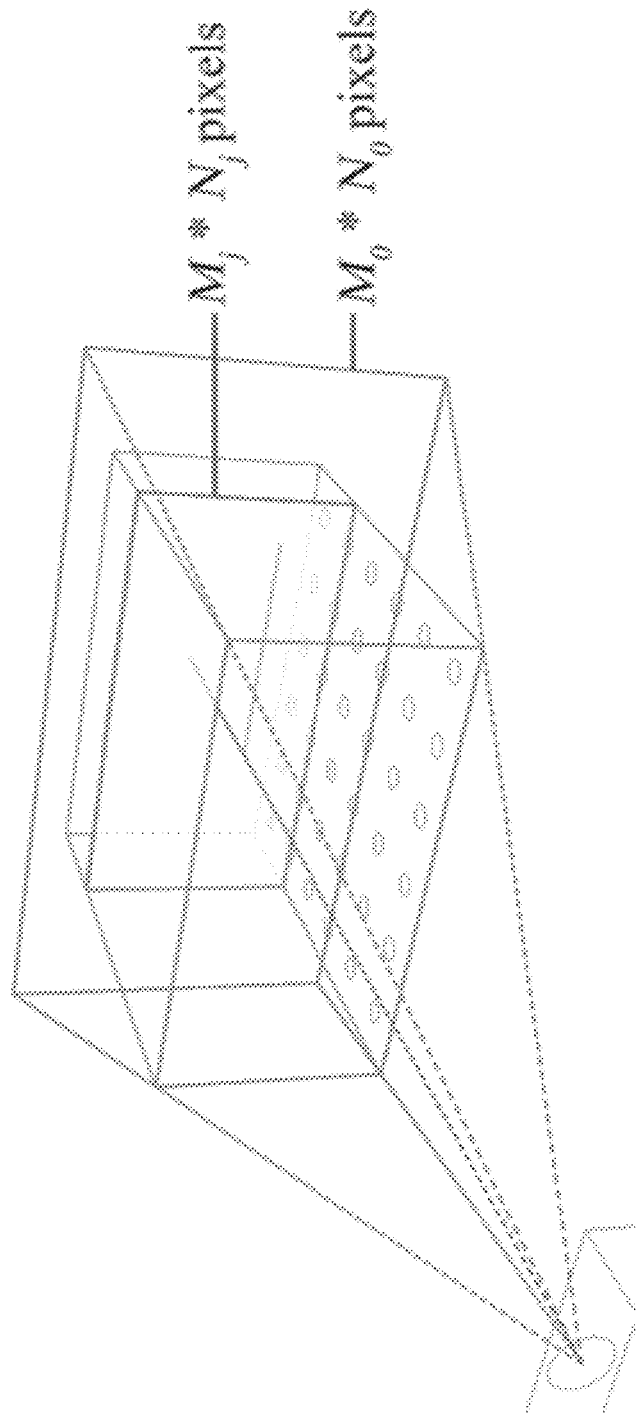
FIG. 8 is an illustration showing different resolutions of projected images on different projection planes within the predetermined three-dimensional space.

With reference to FIG. 8, the resolution of volumetric display, that is the number of distinct voxels that can be displayed, provides an important quantitative measure for evaluation. As previously mentioned, the projector pose remains 1-DOF (projection distance d) along its principal axis. Placing the projector further away from the fog screen will waste a large projection area outside of the display volume and significantly reduce the display resolution. Thus, the projector should be placed as close to the fog screen as possible to maximize the number of usable pixels. However, there are also some constraints, such as to ensure the entire display volume is covered by the projection region. Also, if the projection distance is too short, the fog display may suffer from undesirable artifacts due to occlusion among the fog screen elements. To address this, the minimum distance, called the critical distance $d_{critical}$ is formulated, to avoid such occlusion. Putting all these considerations into account, an optimal projection distance d* may be obtained by solving the constrained optimization problem.

The number of voxels of the proposed 3D fog display can be formulated as follows. Recall that $M_0$ is the horizontal pixel dimension on the front plane that is measured during Step 3 of calibration. It is first needed to express $M_0$ in terms of d. Without loss of generality, the xy aspect ratio of the volumetric display W:H is assumed to be not smaller than the aspect ratio of the projector M:N. The projection area is assumed to covers the entire display volume, that is, M≤M0. Thus, $$M_0 = \frac{MW}{2d\tan\frac{\theta_x}{2}} \quad (6)$$

The display resolution (or total number of voxels) V of the system is formulated as the total pixel resolution of all n image planes. An intuitive understanding of the relation between d and V is that shorten the projection distance can increase the number of pixels being displayed on each image planes, thus enhancing the display resolution. To formally demonstrate this, the display resolution V is expressed as a function of projection distance d based on (4) and (6):

$$V(d) = \sum_{j=1}^{n} M_j N_j = \sum_{j=1}^{n} s_j^2 M_0^2 \frac{H}{W} = \sum_{j=1}^{n} \frac{M^2 WH}{4(d+l_j)^2 \tan^2 \frac{\theta_x}{2}} \quad (7)$$

Thus, V(d) is strictly decreasing.

Figure 9B:
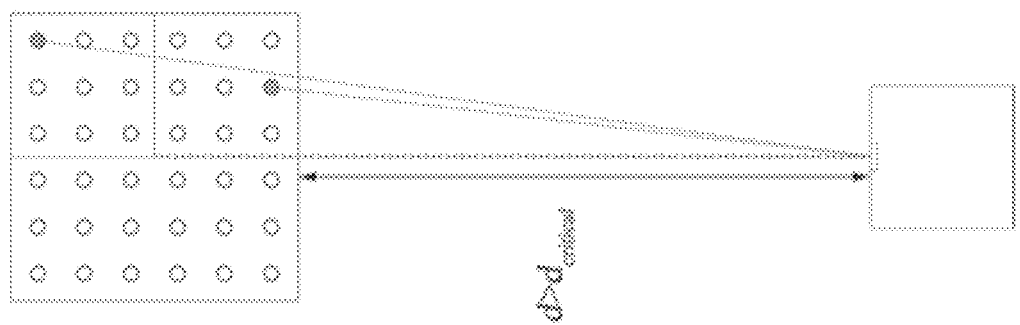
FIG. 9B is an illustration showing $d > d_{critical}$ in which the occurrence of image occlusion of FIG. 9A is avoided.
Figure 9A:
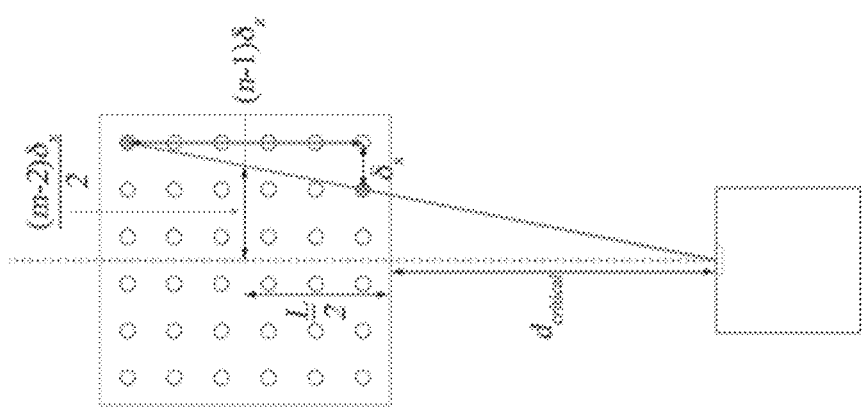
FIG. 9A is an illustration showing an occurrence of image occlusion when $d \leq d_{critical}$.

When the projector is placed very close to the fog screen, there is a possibility that more than one fog elements cast the same image point. With reference to FIG. 9A, a distance called the critical projection distance $d_{critical}$ is defined as:

$$d_{critical} = \frac{1}{2}[\delta_z(m-2)(n-1)-L] \quad (8)$$

When $d=d_{critical}$, $f_{m-1}=1$ and $f_m=n$ (or similarly $f_1=n$ and $f_2=1$), the projection line passes through two activated fog elements at the same time. This makes the two image segments overlap and the projected light to be scattered by both fog columns. To avoid fog occlusion and this undesirable artifact, the projector should be moved away from the fog screen beyond $d_{critical}$ (as shown in FIG. 9B). Illustrative example will be given in a later part of the disclosure to demonstrate the occlusion phenomenon.

The optimal projection distance d* can be obtained by maximizing the display resolution V(d) under constraints:

$$d^* = \underset{d}{\mathrm{argmax}} V(d) \quad (9)$$

$$\text{subject to} \quad d > d_{critical} \quad (10)$$

$$d \geq \frac{W}{2\tan\frac{\theta_x}{2}} \quad (11)$$

$$d \geq \frac{H}{2\tan\frac{\theta_y}{2}} \quad (12)$$

Constraints (11) and (12) are based on the requirement that the entire display volume needs to be covered by the projection volume. According to (7), V(d) is strictly decreasing. Thus, the optimal projection distance d* equals to the largest value among the three lower bounds for d:

$$d^* = \max\left\{\frac{1}{2}[\delta_z(m-2)(n-1)-L], \frac{W}{2\tan\frac{\theta_x}{2}}, \frac{H}{2\tan\frac{\theta_y}{2}}\right\} \quad (13)$$

A focus free projector such as a laser projector may be used such that its depth of field is large enough to cover the display volume 108. Alternatively, the projector's focus may be set to produce the sharpest image on the world xy-plane, where its depth of field is comparable to or larger than the depth of the display volume 108 such that the projected image is acceptably sharp within the entire volume. Moving the projector further away from the fog screen can increase the depth of field. However, it will significantly reduce the display resolution based on (7). The depth of field of the projector will also constrain the depth of the display volume. In this example embodiment, the image remains clear on both front and rear planes even when d<d*. Thus, an additional constraint for d is not imposed to achieve a larger depth of field.

These embodiments are advantageous in that true three-dimensional or volumetric images may be displayed using the display apparatus with the selectively generated fog screen. The light/image projected from the image projector is scattered at different 3D location and forms 3D imagery in the predetermined 3D space. The generated display medium may be used as a non-planar and reconfigurable screen that allows 3D images to be displayed in the real physical space.

Advantageously, the volumetric display does not require special glasses, head-mounted devices or eye-tracking systems for multiple observers to view the 3D images displayed on the screen. In addition, high-definition images may be displayed on the volumetric screen in full-color.

These embodiments of the invention may be widely applied in different technologies such as computer-aided design, architectural and landscape planning, training simulation, telepresence and remote-operation, scientific visualization, medical imaging, creative art, entertainment and advertisement.

With reference to FIGS. 10A to 10E, volumetric images 1002 are displayed using the display apparatus 100 in accordance with an embodiment of the present invention. The display apparatus 100 include a projector 106. The fog display has a high tolerance to off-axis view. Thus, the display has a wide horizontal viewing angle.

In this embodiment, the apparatus for generate display medium 104 comprises m by n closely packed fog emitters 200, where the nozzle distances in both x- and z-directions are uniform $\delta_x = \delta_z$ = constant. H is the measured fog height.

Figure 10C:
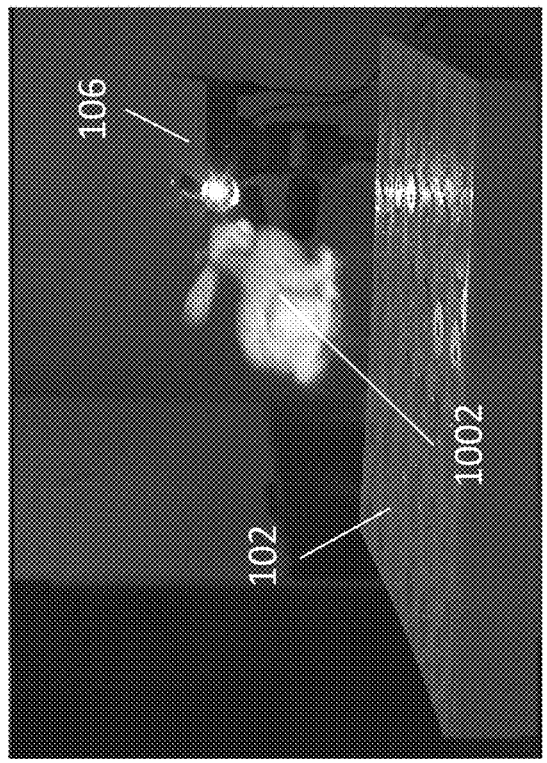
FIG. 10C is an illustration of a different visual image displayed on a display medium generated by the apparatus of FIG. 3A within a three-dimensional space.
Figure 10B:
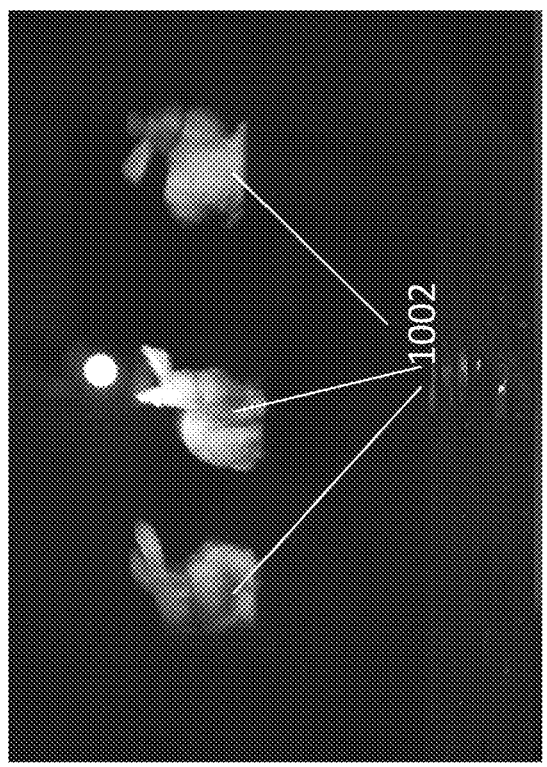
FIG. 10B is an illustration of multiple visual images displayed on a display medium generated by the apparatus of FIG. 3A within a three-dimensional space.

The Stanford bunny model was used as visuals to test the display with different fog configurations. First, the performance was tested using single and multiple fog emitters 200 to display an image object. As shown in FIG. 10A, a small sized bunny model was projected on the fog 104 produced from a single fog emitter 200. The bunny image 1002 appeared to be very clear with high quality of 3D details. Three bunny models were projected onto the fog 104 produced by three different emitters as shown in FIG. 10B. The images 1002 of the bunnies were precisely projected at distinct physical locations. As the display allows a wide off-axis view angle, their actual positions in the space can be naturally perceived by many users at the same time.

Figure 10D:
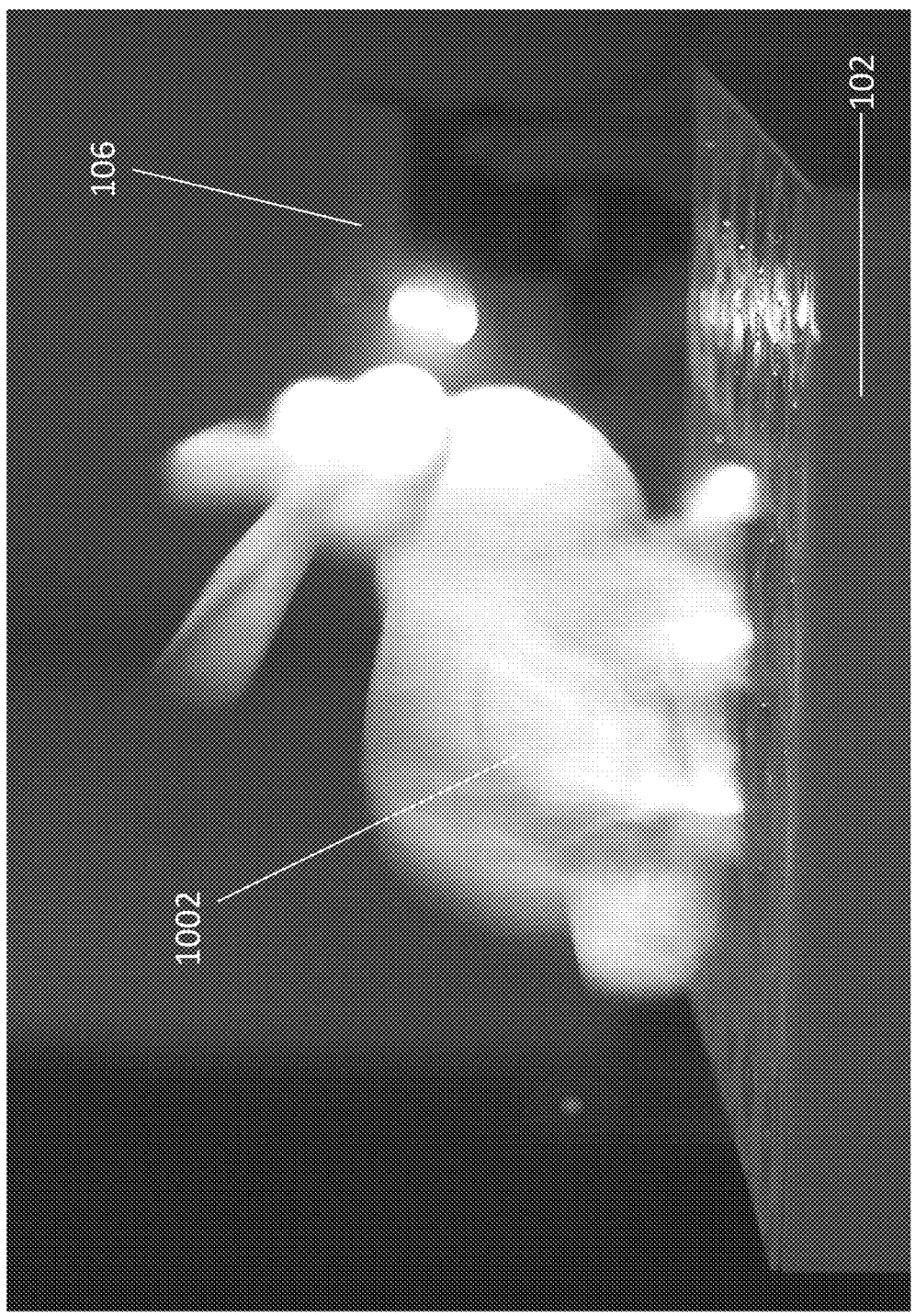
FIG. 10D is an illustration of a different visual image displayed on a display medium generated by the apparatus of FIG. 3A within a three-dimensional space.
Figure 11A:
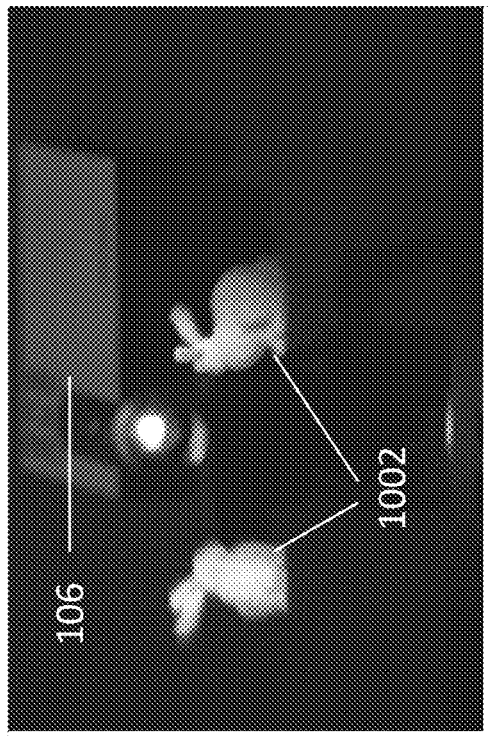
FIG. 11A is an illustration of multiple visual images displayed on a display medium generated by the apparatus of FIG. 4A within a three-dimensional space.
Figure 11B:
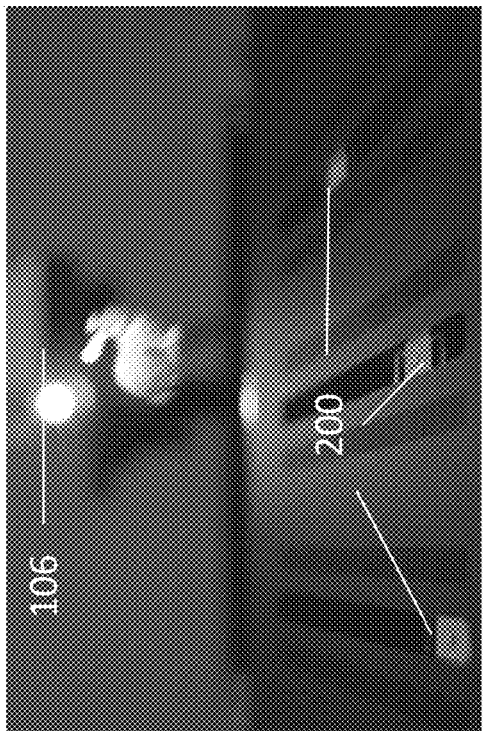
FIG. 11B is an illustration of multiple visual images displayed on a display medium generated by the apparatus of FIG. 4A within a three-dimensional space.
Figure 11C:
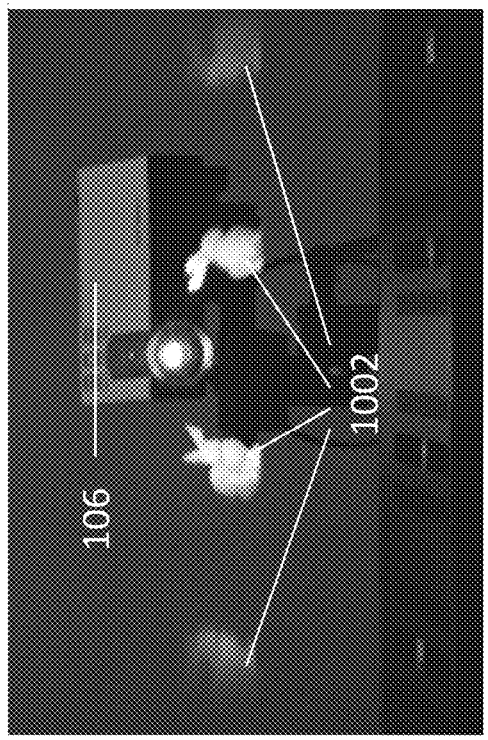
FIG. 11C is an illustration of multiple visual images displayed on a display medium generated by the apparatus of FIG. 4A within a three-dimensional space.
Figure 11D:
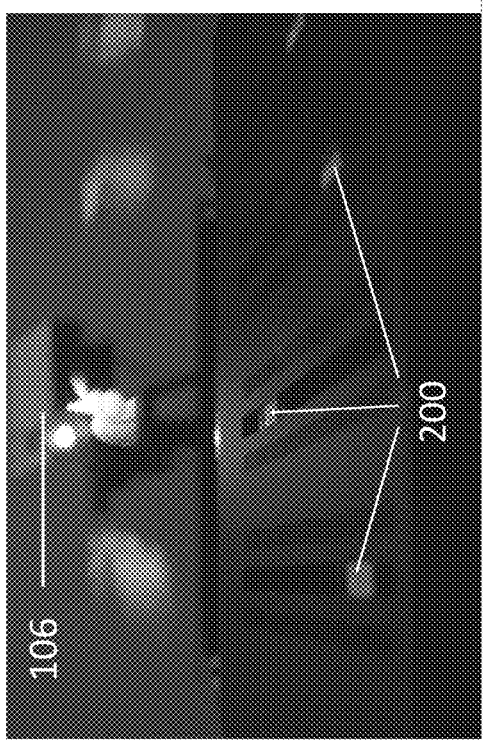
FIG. 11D is an illustration of a visual image displayed on a display medium generated by the apparatus of FIG. 4A within a three-dimensional space.
Figure 12B:
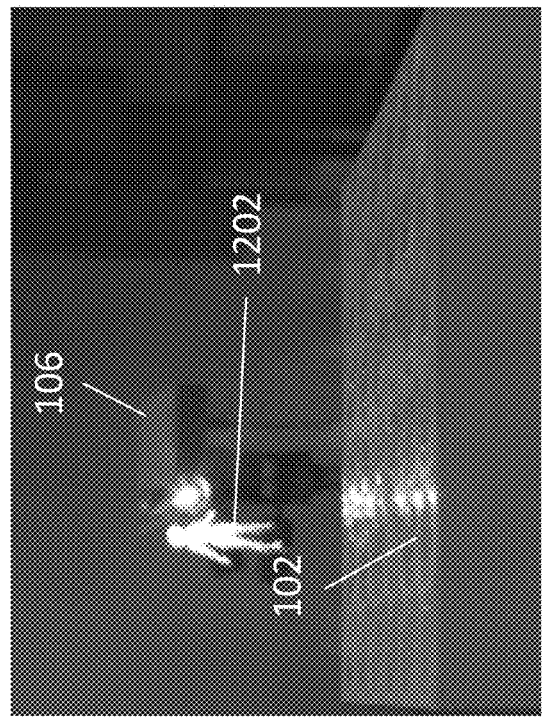
FIG. 12B is an illustration of a visual image representing a moving image of FIG. 12A displayed on a display medium generated by the apparatus of FIG. 3A within a three-dimensional space at a different instance.
Figure 12A:
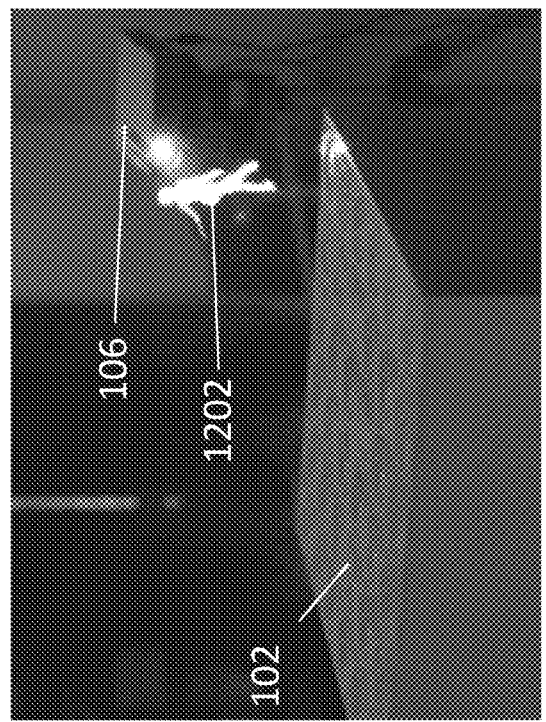
FIG. 12A is an illustration of a visual image representing a moving image displayed on a display medium generated by the apparatus of FIG. 3A within a three-dimensional space at a certain instance.
Figure 13A:
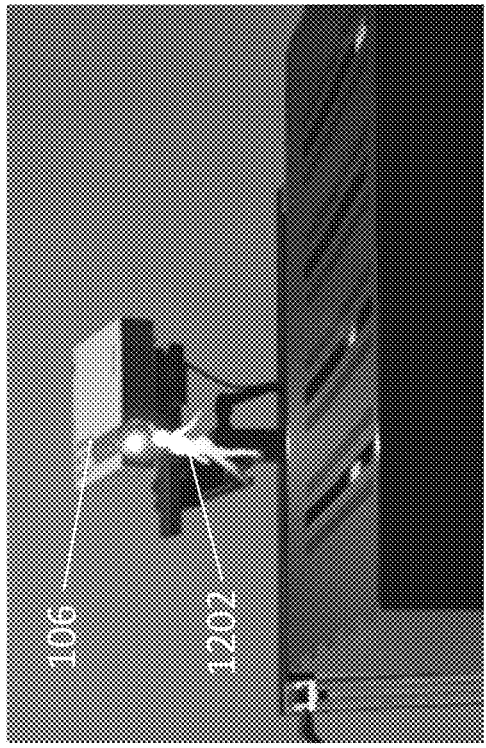
FIG. 13A is an illustration of a visual image representing a moving image displayed on a display medium generated by the apparatus of FIG. 4A within a three-dimensional space at a certain instance.
Figure 13B:
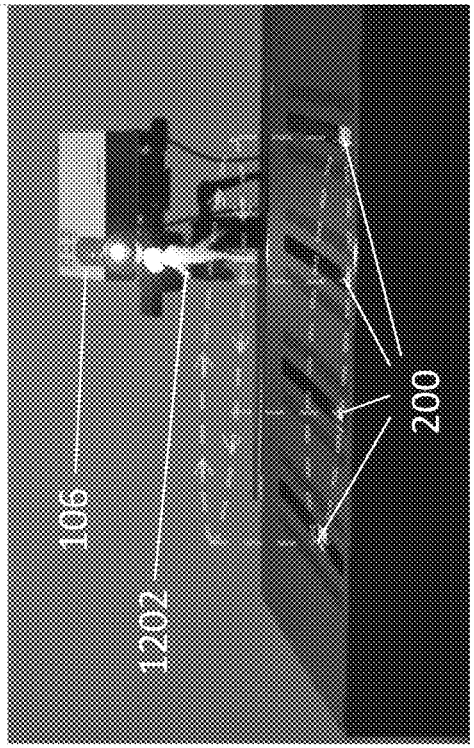
FIG. 13B is an illustration of a visual image representing a moving image of FIG. 13A displayed on a display medium generated by the apparatus of FIG. 4A within a three-dimensional space at a different instance.
Figure 13C:
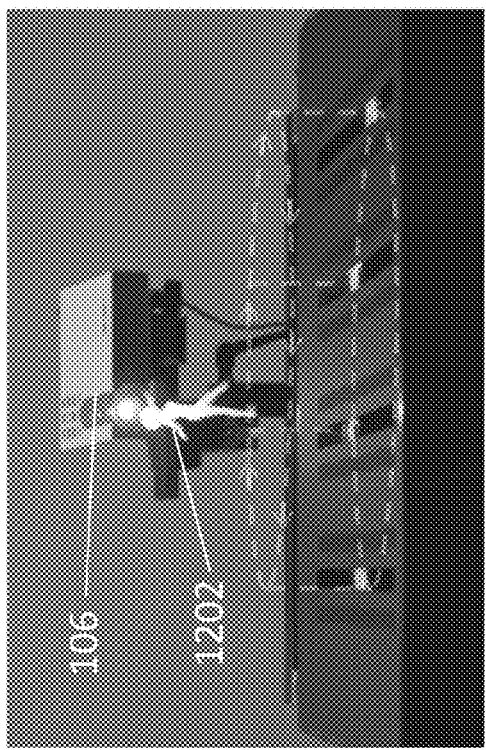
FIG. 13C is an illustration of a visual image representing a moving image of FIG. 13A displayed on a display medium generated by the apparatus of FIG. 4A within a three-dimensional space at a different instance.
Figure 13D:
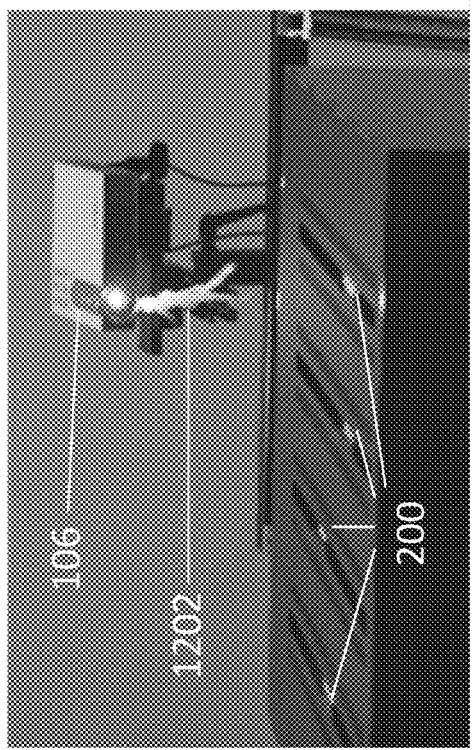
FIG. 13D is an illustration of a visual image representing a moving image of FIG. 13A displayed on a display medium generated by the apparatus of FIG. 4A within a three-dimensional space at a different instance.

The different portions 104P of the display medium 104 generated by the fog emitters 200 can also be combined to create a larger fog screen 104 to display large objects. As shown in FIG. 10C and 10D, three and six emitters 202 in same row were used simultaneously to display larger images 1002 of bunny models. This demonstrates that the capability of the system in displaying objects of a wide range of scale. Moreover, all tests verified that the image transformation method can precisely scale and translate the objects to their desired sizes and positions in the display volume.

In another example embodiment, the display apparatus 100 comprises a similar image projector 106, and the apparatus for generate display medium 104 comprises four display medium generators 200 placed on linear motion platforms 402 as shown in FIGS. 4A to 5.

With reference to FIGS. 11A to 11D, similar Stanford bunny model was used to test the display with different fog screen configurations. First, the performance was tested using single and multiple fog emitters 200 to display one image object. Four bunny models were projected on the fog screen 104. The bunny images appeared to be very clear with high quality of 3D details. When relocating the bunnies to different positions, the software automatically moves the fog emitter 200 so that the fog screen 104 is reshaped to show the bunnies at corrected positions. The depth and relative positions can be naturally perceived. Moreover, the tests have verified that the image transformation method can precisely scale and translate the objects to their desired sizes and positions in the image space.

The display apparatus 100 was also tested with dynamic objects. With reference to FIGS. 12A to 13D, the performance of displaying dynamic content was tested by using an animated GIF image of the bistable optical illusion called the Spinning Dancer. Rather than just spinning around at a fixed location, the displayed image 1202 was given a planned roundtrip, 3D path (as illustrated by the path on the Figures) to travel within the display volume (and across the two-dimensional plane 110). The trajectory was represented by translation in image coordinate together with a fog vector f to define the z position in every image frame. The system used f to switch the fog emitter matrix. When the dancer 1202 travelled between different depth levels, the software resized the image so that there is no size distortion. Alternatively or additionally, the fog emitter 200 may travel to a different position such that the image of the dancer 1202 is displayed at the desired position. It is demonstrated that the good 3D display quality and nice continuity of moving.

Figure 14B:
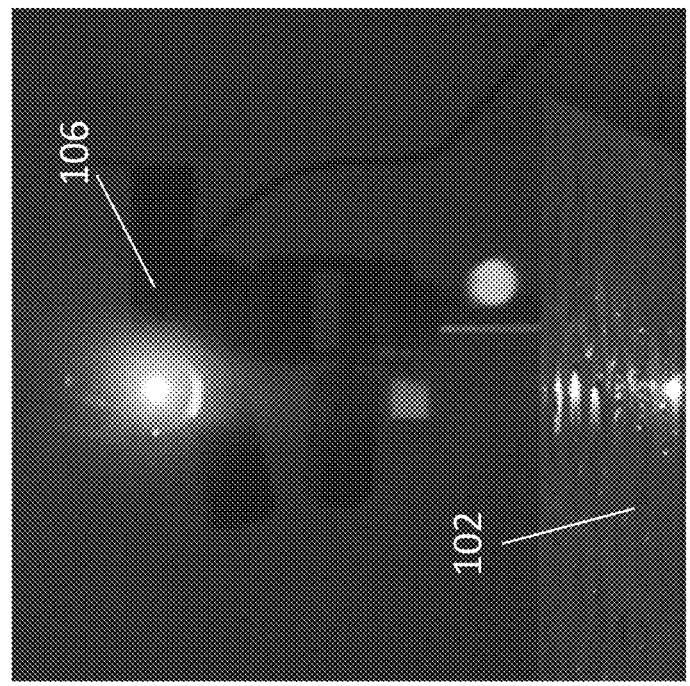
FIG. 14B a visual image displayed on a display medium within a three-dimensional space with image occlusion of FIG. 14A being avoided.
Figure 14A:
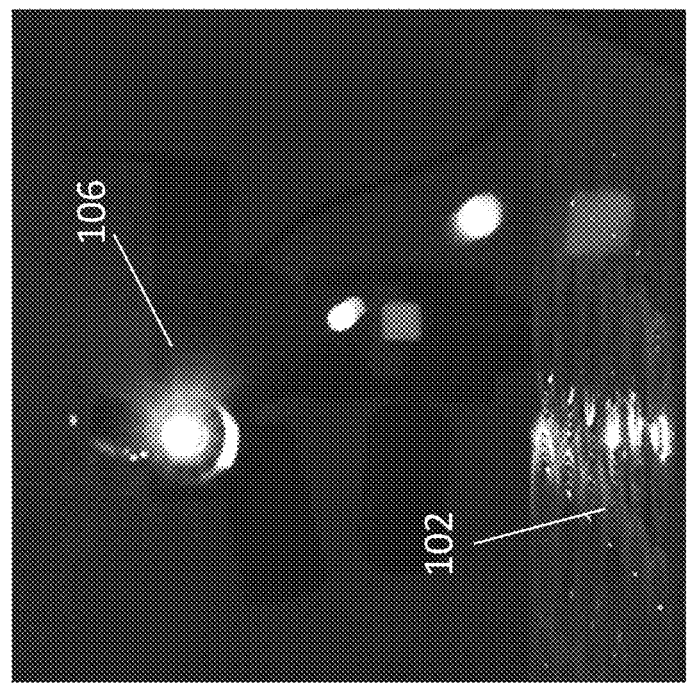
FIG. 14A is an illustration of a visual image displayed on a display medium within a three-dimensional space with image occlusion occurs.

To illustrate the concept of fog occlusion and critical projection distance as described earlier, the same 3D content with two different projection distances were displayed. A square was to be projected at the fog in the 1st column and the 6th row, and a circle was to be projected at the fog in the 2nd column and the 1st row. Thus, the fog emitters 200 at these two positions were switched on. The projector was placed close to the display so that $d < d_{critical}$. It is shown in FIG. 14A that both patterns appeared at both positions because the projection rays overlapped and the fog screen failed to separate the patterns. When d was increased so that $d > d_{critical}$, the two patterns did not overlap and could be formed at two distinct locations as shown in FIG. 14B. This proved that the critical projection distance can avoid the overlapping artifacts.

Figure 15:
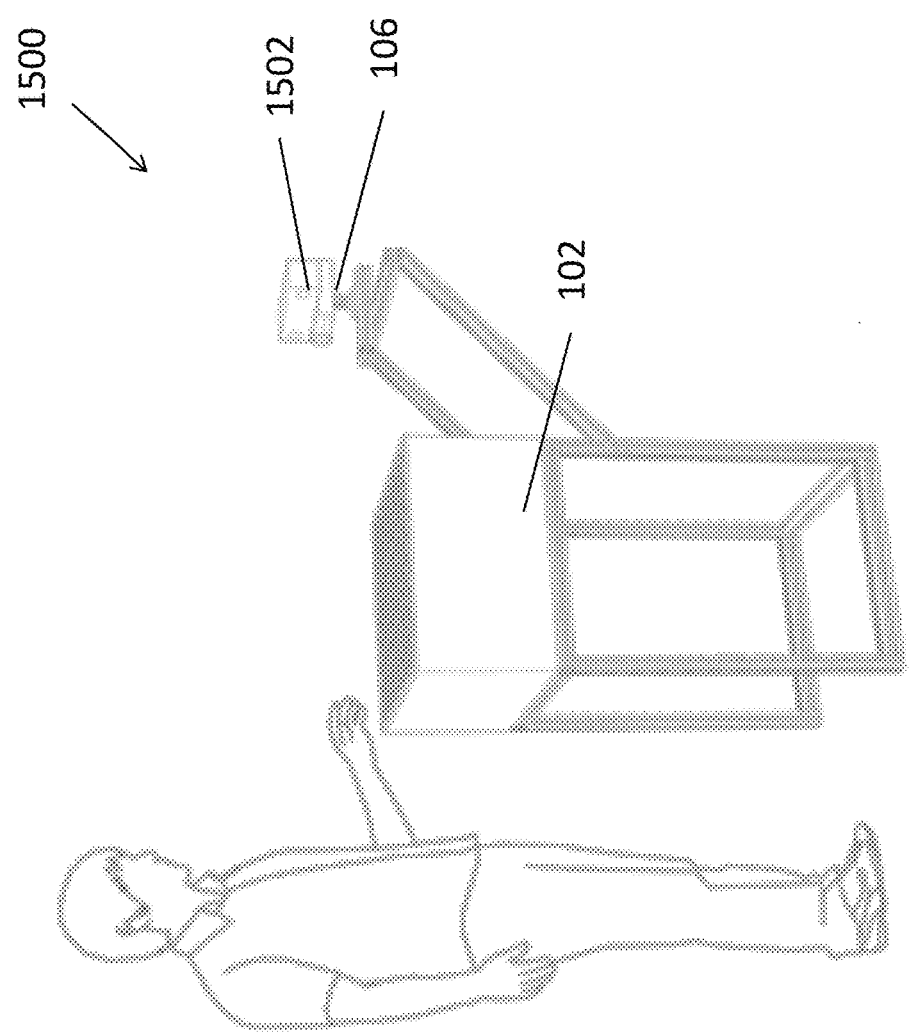
FIG. 15 is an illustration of a user interacting with a display apparatus in accordance with an embodiment of the present invention.

With reference to FIG. 15, there is shown an embodiment of a display apparatus 1500 which further comprises an image capturing module 1502 arranged to capture an image and/or a motion of an object 1504 within the predetermined three-dimensional space 108. This may include an interaction of a user. For example, depth cameras or infra-red sensors may be used for hand tracking and object recognition, and then corresponding display of visible images may be produced by the display apparatus 100.

The image capturing module 1502 and the projector 106 may be calibrated using chessboard and projected structured light. The obtained parameters are used to define the camera model in the virtual replica of the 3D scene for rendering the projected image with corrected perspective and lens distortions. The coordinates of detected hands or objects 1504 are used to switch on the correct fog emitters 200 to ensure that the projected light/optical signal is scattered and form image at accurate 3D location.

Figure 16:
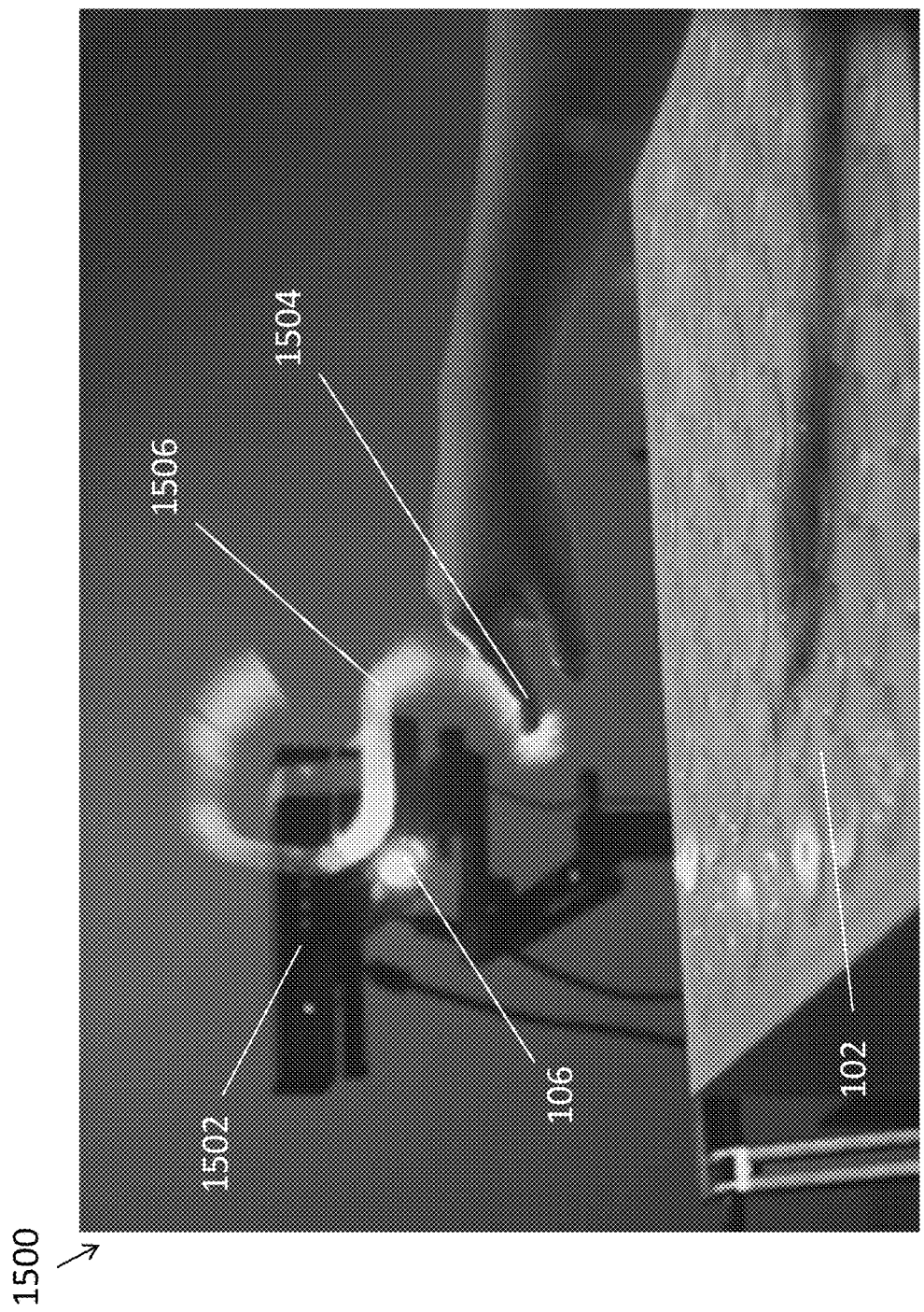
FIG. 16 is an illustration of an example interaction with the display apparatus of FIG. 15.

With reference to FIG. 16, the image capturing module 1502 is arranged to capture a motion of an object 1504 moving within the predetermined three-dimensional space 108 and displaying the visible image 1506 representing the motion captured. A user may create freehand drawings by moving his finger 1504 in front of the image capturing module, the display apparatus 100 may allow the renderer to translate the finger's 3D coordinates to 2D pixel coordinates of the image which is projected on the fog screen 104 and create strokes 1506 in mid-air that represent the finger's 3D trajectories.

Figure 18:
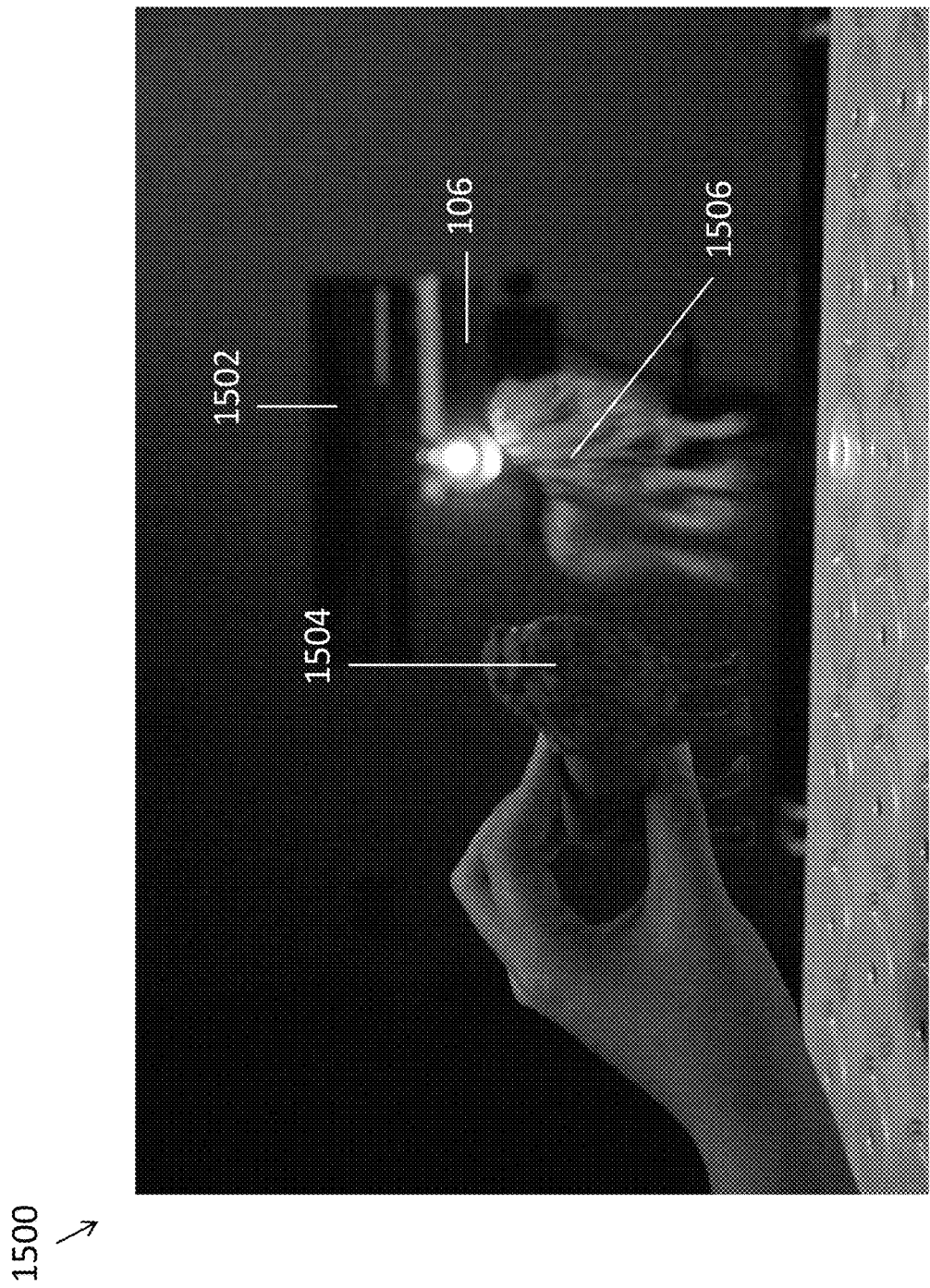
FIG. 18 is an illustration of another example of interaction with the display apparatus in accordance with another embodiment of the present invention.

With reference to FIG. 18, the image capturing module 1502 is arranged to capture an image of an object 1504 placed within the predetermined three-dimensional space 108 and displaying the visible image 1506 representing the image at a same or different position of the object 1504 placed within the predetermined three-dimensional space 108. For example, physical objects 1504 may be placed at any locations within the display volume. The system will create an image 1506 of the object in mid-air at the identical 3D location resembling each of the detected objects 1504.

Figure 17:
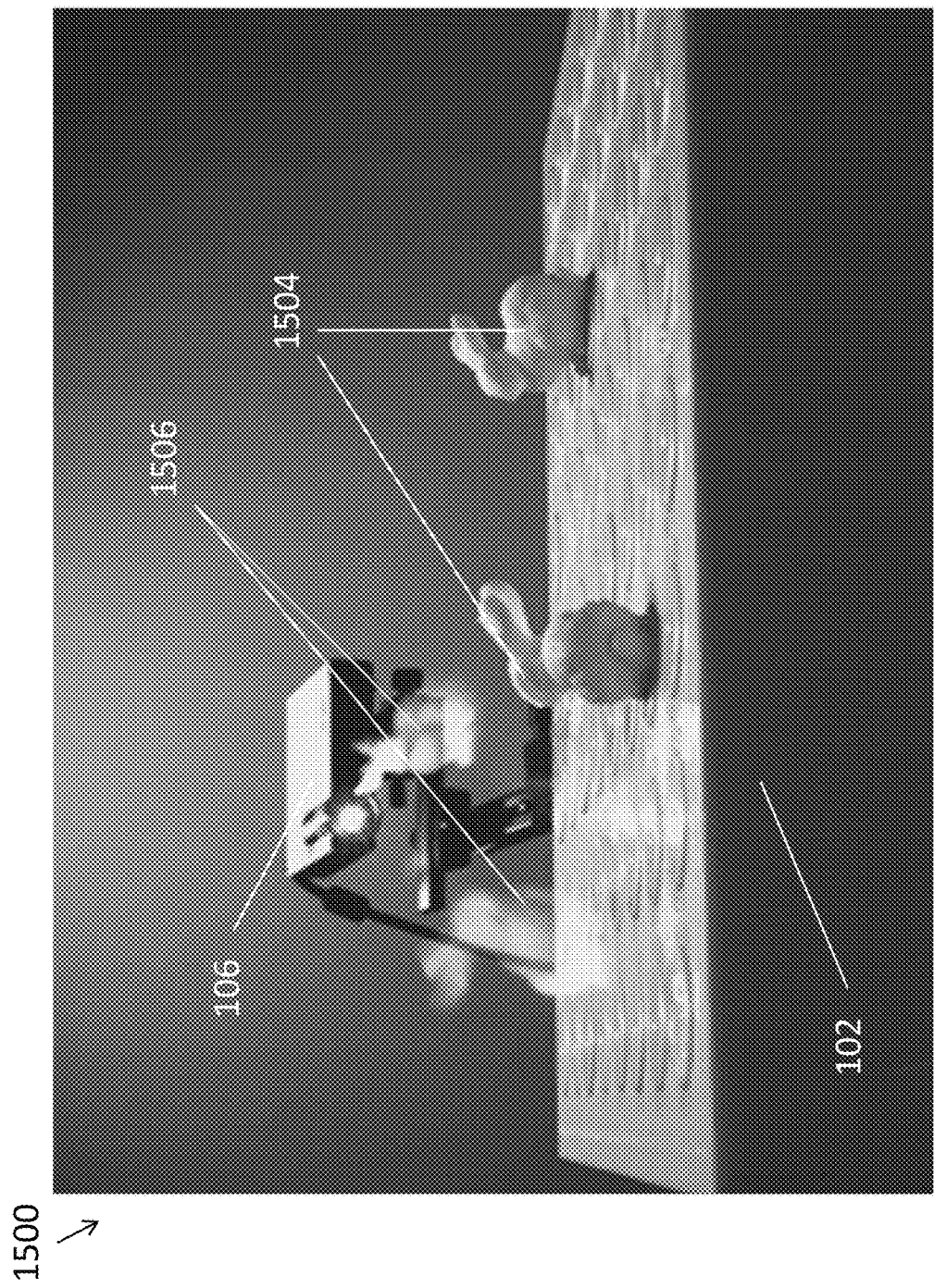
FIG. 17 is an illustration of an example of coexistence of real physical objects and virtual objects (image) with the display apparatus in accordance with another embodiment of the present invention.

Advantageously, with reference to FIGS. 17 and 18, the display apparatus may be used in mixed reality settings where physical objects co-exist and interact with the 3D imagery in physical space.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An apparatus for generating a partial or whole visible image using a display medium, the apparatus comprising:
a plurality of medium generators providing at least one portion of the display medium along a linear pathway, wherein the plurality of medium generators are arranged along a first axis that is substantially orthogonal to the linear pathway, and each comprises a plurality of substance emitters arranged along the linear pathway so as to selectively generate the display medium at a plurality of positions at different depths along the linear pathway, and wherein the display medium is arranged to receive an optical signal representing a visible image so as to display the partial or whole visible image at one or more depths along the linear pathway and across a two-dimensional plane.

2. The apparatus in accordance with claim 1, wherein the display medium includes a medium substance having a refractive index different from that of a surrounding substance at a boundary defined between the medium substance and the surrounding substance.

3. The apparatus in accordance with claim 2, wherein the medium substance is in a form of at least one of mist, fog, vapor, steam and particles.

4. The apparatus in accordance with claim 2, wherein each of the plurality of medium generators comprises at least one ultrasonic piezoelectric transducer arranged to generate the medium substance that suspends in air.

5. The apparatus in accordance with claim 1, wherein the plurality of substance emitters is arranged in a two-dimensional array across the two-dimensional plane.

6. The apparatus in accordance with claim 5, wherein the portion of the display medium is generated along a second axis being orthogonal to the two-dimensional plane.

7. The apparatus in accordance with claim 6, wherein each of the plurality of medium generators further comprises at least one fan unit arranged to align the generated portion of the display medium to the second axis.

8. The apparatus in accordance with claim 5, further comprising an optical projection source projecting the optical signal on the display medium.

9. The apparatus in accordance with claim 8, wherein the visible image is displayed at one or more of a plurality of positions across the two-dimensional plane when the optical signal is projected on the display medium.

10. A display apparatus comprising:
an apparatus for generating a display medium in accordance with claim 1; and
an optical projection source arranged to project the optical signal representing a visible image to the display medium.

11. The display apparatus in accordance with claim 10, further comprising an optical sensor capturing an image and/or a motion of an object within the predetermined three-dimensional space.

12. A method of displaying a visible image, comprising the steps of:
selectively generating at least one portion of a display medium at different depths along a linear pathway by a plurality of substance emitters arranged along the linear pathway or a substance emitter movable along the linear pathway;
selectively generating the display medium at a plurality of positions across a two-dimensional plane defined by a plurality of linear pathways within a predetermined three-dimensional space;
projecting an optical signal representing a visible image to the display medium generated in said step of generating; and
displaying a partial or whole visible image at different depths along the linear pathway and across the two-dimensional plane.

13. The method of displaying a visible image in accordance with claim 12, further comprising the step of aligning the generated portion of the display medium to an axis being substantially orthogonal to the two-dimensional plane.

14. The method of displaying a visible image in accordance with claim 12, further comprising the steps of capturing an image of an object placed within the predetermined three-dimensional space and displaying the visible image representing the image at a same or different depths of the object.

15. The method of displaying a visible image in accordance with claim 12, further comprising the steps of capturing motion of an object moving within the predetermined three-dimensional space and displaying the visible image representing the motion captured.

16. The method of displaying a visible image in accordance with claim 12, further comprising the steps of capturing an image of an object placed within the predetermined three-dimensional space and displaying the visible image representing the image that is interactive to the position of the object.

17. An apparatus for generating a partial or whole visible image using a display medium, the apparatus comprising:
a plurality of medium generators arranged to selectively generate at least one portion of the display medium along a linear pathway, the plurality of medium generators being arranged along a first axis that is substantially orthogonal to the linear pathway, and each comprising a substance emitter arranged to move along the linear pathway so as to selectively generate the display medium at a plurality of positions at different depths along the linear pathway, wherein the display medium is arranged to receive an optical signal representing a visible image so as to display a partial or whole visible image at different depths along the linear pathway and across a two-dimensional plane.

18. The apparatus in accordance with claim 17, wherein the medium generator further comprises a motion platform arranged to move the substance emitter along the linear pathway.

19. The apparatus in accordance with claim 18, wherein the portion of the display medium is being generated along a second axis substantially orthogonal to the two-dimensional plane by the plurality of medium generators.

20. The apparatus in accordance with claim 19, wherein each of the plurality of medium generators further comprises at least one fan unit arranged to align the generated portion of the display medium to the second axis.

21. The apparatus in accordance with claim 18, wherein the display medium is arranged to receive the optical signal generated by an optical projection source, and wherein the visible image is displayed when upon the optical signal is projected on the display medium.

22. The apparatus in accordance with claim 21, wherein the visible image is displayed at one or more of a plurality of positions across the two-dimensional plane when upon the optical signal is projected on the portion of the display medium generated at the one or more of the plurality of positions across the two-dimensional plane.

23. The apparatus in accordance with claim 17, wherein the display medium includes a medium substance having a refractive index different from that of a surrounding substance exists in a surrounding environment.

24. The apparatus in accordance with claim 23, wherein the medium substance is in a form of at least one of mist, fog, vapor, steam and particles.

25. The apparatus in accordance with claim 23, wherein each of the plurality of medium generators comprises at least one ultrasonic piezoelectric transducer arranged to generate the medium substance that suspends in air.

26. A display apparatus comprising:
   an apparatus for generating a display medium in accordance with claim 17; and
   an optical projection source arranged to project the optical signal representing a visible image to the display medium.

27. The display apparatus in accordance with claim 26, further comprising an optical sensor arranged to capture an image and/or a motion of an object within the predetermined three-dimensional space.

\* \* \* \* \*